United States Patent
Chuang et al.

(10) Patent No.: US 10,523,964 B2
(45) Date of Patent: Dec. 31, 2019

(54) INTER PREDICTION REFINEMENT BASED ON BI-DIRECTIONAL OPTICAL FLOW (BIO)

(71) Applicant: QUALCOMM Incorporated, San Diego, CA (US)

(72) Inventors: Hsiao-Chiang Chuang, San Diego, CA (US); Jianle Chen, San Diego, CA (US); Yi-Wen Chen, San Diego, CA (US); Xiang Li, San Diego, CA (US); Marta Karczewicz, San Diego, CA (US); Wei-Jung Chien, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/919,060

(22) Filed: Mar. 12, 2018

(65) Prior Publication Data

US 2018/0262773 A1    Sep. 13, 2018

Related U.S. Application Data

(60) Provisional application No. 62/470,809, filed on Mar. 13, 2017.

(51) Int. Cl.
*H04N 19/543* (2014.01)
*H04N 19/517* (2014.01)
(Continued)

(52) U.S. Cl.
CPC .......... *H04N 19/543* (2014.11); *H04N 5/145* (2013.01); *H04N 19/107* (2014.11); *H04N 19/20* (2014.11);
(Continued)

(58) Field of Classification Search
CPC .... H04N 19/543; H04N 19/517; H04N 19/61; H04N 19/107; H04N 5/145; H04N 19/30; H04N 19/577; H04N 19/70; H04N 19/20
(Continued)

(56) References Cited

U.S. PATENT DOCUMENTS

2018/0192071 A1* 7/2018 Chuang ................ H04N 19/577

FOREIGN PATENT DOCUMENTS

WO     2017036399 A1    3/2017

OTHER PUBLICATIONS

Leontaris A., et al., "Multiple Reference Motion Compensation: A Tutorial Introduction and Survey", Foundations and Trends in Signal Processing vol. 2, No. 4, 2008, pp. 247-364.
(Continued)

*Primary Examiner* — Hee-Yong Kim
(74) *Attorney, Agent, or Firm* — Shumaker & Sieffert, P.A.

(57) ABSTRACT

A video decoder can be configured to determine that a block of video data is encoded using a bi-directional inter prediction mode; determine that the block of video data is encoded using a bi-directional optical flow (BIO) process; inter predict the block of video data according to the bi-directional inter prediction mode; perform the BIO process for the block, wherein performing the BIO process for the block comprises determining a single motion vector refinement for a group of pixels in the block, wherein the group of pixels comprises at least two pixels; refine the group of pixels based on the single motion vector refinement; and output a BIO refined predictive block of video data comprising the refined group of pixels.

33 Claims, 25 Drawing Sheets

(51) Int. Cl.
| | |
|---|---|
| *H04N 19/61* | (2014.01) |
| *H04N 19/107* | (2014.01) |
| *H04N 19/20* | (2014.01) |
| *H04N 19/30* | (2014.01) |
| *H04N 19/577* | (2014.01) |
| *H04N 19/70* | (2014.01) |
| *H04N 5/14* | (2006.01) |

(52) U.S. Cl.
CPC ........... *H04N 19/30* (2014.11); *H04N 19/517* (2014.11); *H04N 19/577* (2014.11); *H04N 19/61* (2014.11); *H04N 19/70* (2014.11)

(58) Field of Classification Search
USPC .................................................... 375/240.12
See application file for complete search history.

(56) References Cited

OTHER PUBLICATIONS

Bordes, et al., "Description of SDR, HDR and 360 Video Coding Technology Proposal by Qualcomm and Technicolor—Medium Complexity Version," JVET-J0022r1, 10th Meeting; San Diego, US, Apr. 10-20, 2018, (The Joint Video Exploration Team of ISO/IEC JTC1/SC29/WG11 and ITU-T SG.16); 84 pp.

Chen Y., et al., "Description of SDR, HDR and 360 Degree Video Coding Technology Proposal by Qualcomm and Technicolor—Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.

International Search Report and Written Opinion—PCT/US2018/022226—ISA/EPO—Jun. 27, 2018 (173356WO).

ITU-T H.223, Series H: Audiovisual and Multimedia Systems "Multiplexing Protocol for Low Bit Rate Multimedia Communication," Jul. 2001, pp. 1-74.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTV-L1003_v34, Mar. 19, 2013, 310 pp.

Chen J., et al., "Algorithm Description of Joint Exploration Test Model 5 (JEM 5)" Joint Video Exploration Team (JVET) of ITU-T SG 16 WP 3 and ISO/IEC JTC 1/SC 29/WG 11, 5th Meeting: Geneva, Jan. 12-20, 2017, JVET-E1001-v2, 44 Pages.

Chen et al., "Alogorithm Description of Joint Exploration Test Model 7 (JEM 7)," Joint Video Exploration Team (JVET) of ITU-T SG 16 WP 3 and ISO/IEC JTC 1/SC 29/WG11, 7th Meeting: Torino, IT< Jul. 13-21, 2017, JVET-G1001-v1, 50 pp.

Alshina E., et al., "Known Tools Performance Investigation for Next Generation Video Coding," 52nd Meeting, Jun. 19 through 26, 2015, Warsaw, Poland; ITU-Telecommunications Standardization Sector, Study Group 16 Question 6, Video Coding Experts Group (VCEG), VCEG-AZ05_r1, Jun. 25, 2015, 7 pp.

Alshin A., et al., "Bi-Directional Optical flow for Improving Motion Compensation," 2010 Picture Coding Symposium (PCS 2010): Nagoya, Japan, Dec. 8-10, 2010, Dec. 1, 2010 (Dec. 1, 2010), pp. 422-425, XP055324095, Piscataway, NJ, DOI: 10.1109/PCS.2010.5702525, ISBN: 978-1-4244-7134-8.

ITU-T H.263, Series H: Audiovisual and Multimedia Systems, Infrastructure of audiovisual services—Coding of moving video, Video coding for low bit rate communication, The International Telecommunication Union, Jan. 2005, 226 pp.

Tu S.-F., et al., "A Novel Framework for Frame Rate Up Conversion by Predictive Variable Block-Size Motion Estimated Optical Flow," International Congress on Image and Signal Processing (CISP), 2009, 5 Pages.

Chuang et al., "EE2: A block-based design for Bi-directional optical flow (BIO)," Joint Video Exploration Team (JVET) of ITU-T SG 16 WP 3 and ISO/IEC JTC 1/SC 29/WG 11, 7th Meeting; Torino, IT; Jul. 13-21, 2017, JVET-G0082, Jul. 5, 2017, 6 pp.

Sullivan, et al., "Overview of the High Efficiency Video Coding (HEVC) Standard," IEEE Transactions on Circuits and Systems for Video Technology, IEEE Service Center, Piscataway, NJ, US, vol. 22 (12), Dec. 1, 2012, XP011486324, pp. 1649-1668.

Alshina, et al., "Description of Exploration Experiments on Coding Tools," Joint Video Exploration Team (JVET) of ITU-T SG 16 WP 3 and ISO/IEC JTC 1/SC 29/WG 11; 6th Meeting: Hobard, AU, Mar. 31-Apr. 7, 2017, JVET-F1011, Apr. 29, 2017, 10 pp.

Alshin, et al., "EE3: BIO w/o block extension," Joint Video Exploration Team (JVET) of ITU-T SG 16 WP 3 and ISO/IEC JTC 1/SC 29/WG 11; 6th Meeting: Hebard, AU, Mar. 31-Apr. 7, 2017, JVET-F0028, Mar. 28, 2017, 4 pp.

Chen J., et al., "Algorithm Description of Joint Exploration Test Model 6 (JEM 6)," Joint Video Exploration Team (JVET) of ITU-T SG 16 WP 3 and ISO/IEC JTC 1/SC 29/WG 11, 6th Meeting; Hobart, AU, Mar. 31-Apr. 7, 2017, Document: JVET-F1001-v3, Jun. 30, 2017, 48 pp.

Alshin, et al., "EE3: bi-directional optical flow w/o block extensions," Joint Video Exploration Team (JVET) of ITU-T SG 16 WP 3 and ISO/IEC JTC 1/SC 29/WG 11; 5th Meeting; Geneva, Jan. 12-20, 2017, document No. JVET-E0028, Jan. 17, 2017, 6 pp.

Chuang, et al., "EE2-related: A simplified gradient filter for Bi-directional optical flow (BIO)," Joint Video Exploration Team (JVET) of ITU-T SG 16 WP 3 and ISO/IEC JTC 1/SC 29/WG 11; 7th Meeting; Jul. 13-21, 2017, document No. JVET-G0083, Jul. 14, 2017, 5 pp.

Alshina, "EE2 Cross-check for block-based BIO Design," Joint Video Exploration Team (JVET) of ITU-T SG 16 WP 3 and ISO/IEC JTC 1/SC 29/WG 11; 7th Meeting; Jul. 13-21, 2017, document No. JVET-G0116, Jul. 10, 2017, 4 pp.

Chuang, et al., "A block-based design for Bi-directional optical flow (BIO)," Joint Video Exploration Team (JVET) of ITU-T SG 16 WP 3 and ISO/IEC JTC 1/SC 29/WG 11; 6th Meeting; Mar. 13-Apr. 7, 2017, document No. JVET-F0022, Mar. 15, 2017, 3 pp.

Bossen et al., "JEM Software Manual," Joint Collaborative Team on Video coding (JCT-VC) of ITU-T SG16 WP3 and ISO/IEC JTC1/SC29/WG11, document: JCTVC-Software Manual, Aug. 3, 2016, 29 pp.

* cited by examiner

| 1 | 2 | 3 | 4 | 4 | 3 | 2 | 1 |
|---|---|---|---|---|---|---|---|
| 2 | 4 | 6 | 8 | 8 | 6 | 4 | 2 |
| 3 | 6 | 9 | 12 | 12 | 9 | 6 | 3 |
| 4 | 8 | 12 | 16 | 16 | 12 | 8 | 4 |
| 4 | 8 | 12 | 16 | 16 | 12 | 8 | 4 |
| 3 | 6 | 9 | 12 | 12 | 9 | 6 | 3 |
| 2 | 4 | 6 | 8 | 8 | 6 | 4 | 2 |
| 1 | 2 | 3 | 4 | 4 | 3 | 2 | 1 |

FIG. 12A

| 1 | 2 | 3 | 3 | 2 | 1 |
|---|---|---|---|---|---|
| 2 | 4 | 6 | 6 | 4 | 2 |
| 3 | 6 | 9 | 9 | 6 | 3 |
| 3 | 6 | 9 | 9 | 6 | 3 |
| 2 | 4 | 6 | 6 | 4 | 2 |
| 1 | 2 | 3 | 3 | 2 | 1 |

FIG. 12B

| 1 | 2 | 2 | 2 | 2 | 1 |
|---|---|---|---|---|---|
| 2 | 4 | 4 | 4 | 4 | 2 |
| 2 | 4 | 4 | 4 | 4 | 2 |
| 2 | 4 | 4 | 4 | 4 | 2 |
| 2 | 4 | 4 | 4 | 4 | 2 |
| 1 | 2 | 2 | 2 | 2 | 1 |

FIG. 12C

| 1 | 2 | 2 | 1 |
|---|---|---|---|
| 2 | 4 | 4 | 2 |
| 2 | 4 | 4 | 2 |
| 1 | 2 | 2 | 1 |

FIG. 12D

INTER PREDICTION REFINEMENT BASED ON BI-DIRECTIONAL OPTICAL FLOW (BIO)

This Application claims the benefit of U.S. Provisional Patent Application No. 62/470,809 filed 13 Mar. 2017, which is hereby incorporated by reference in its entirety.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture may be encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, the techniques of this disclosure are related to improvements of bi-directional optical flow (BIO) video coding techniques used in conjunction with bi-directional inter prediction.

According to one example, a method of decoding video data includes determining that a block of video data is encoded using a bi-directional inter prediction mode; determining that the block of video data is encoded using a bi-directional optical flow (BIO) process; inter predicting the block of video data according to the bi-directional inter prediction mode; performing the BIO process for the block, wherein performing the BIO process for the block comprises determining a single motion vector refinement for a group of pixels in the block and refining the group of pixels based on the single motion vector refinement, wherein the group of pixels comprises at least two pixels; and outputting a BIO refined predictive block of video data comprising the refined group of pixels.

In another example, a device for decoding video data includes a memory configured to store the video data; and one or more processors configured to determine that a block of video data is encoded using a bi-directional inter prediction mode; determine that the block of video data is encoded using a bi-directional optical flow (BIO) process; inter predict the block of video data according to the bi-directional inter prediction mode; perform the BIO process for the block, wherein to perform the BIO process for the block, the one or more processors are configured to determine a single motion vector refinement for a group of pixels in the block, wherein the group of pixels comprises at least two pixels and refine the group of pixels based on the single motion vector refinement; and output a BIO refined predictive block of video data comprising the refined group of pixels.

In another example, an apparatus for decoding video data includes means for determining that a block of video data is encoded using a bi-directional inter prediction mode; means for determining that the block of video data is encoded using a bi-directional optical flow (BIO) process; means for inter predicting the block of video data according to the bi-directional inter prediction mode; means for performing the BIO process for the block, wherein the means for performing the BIO process for the block comprises means for determining a single motion vector refinement for a group of pixels in the block and means for refining the group of pixels based on the single motion vector refinement, wherein the group of pixels comprises at least two pixels; and means for outputting a BIO refined predictive block of video data comprising the refined group of pixels.

In another example, a computer-readable storage medium stores instructions that when executed by one or more processors cause the one or more processors to determine that a block of video data is encoded using a bi-directional inter prediction mode; determine that the block of video data is encoded using a bi-directional optical flow (BIO) process; inter predict the block of video data according to the bi-directional inter prediction mode; perform the BIO process for the block, wherein to perform the BIO process for the block, the instructions cause the one or more processors to determine a single motion vector refinement for a group of pixels in the block and refine the group of pixels based on the single motion vector refinement, wherein the group of pixels comprises at least two pixels; and output a BIO refined predictive block of video data comprising the refined group of pixels.

The details of one or more examples of the disclosure are set forth in the accompanying drawings and the description below. Other features, objects, and advantages will be apparent from the description, drawings, and claims.

BRIEF DESCRIPTION OF DRAWINGS

FIGS. 12A-12D show examples of weighting functions.

DETAILED DESCRIPTION

Figure 1:
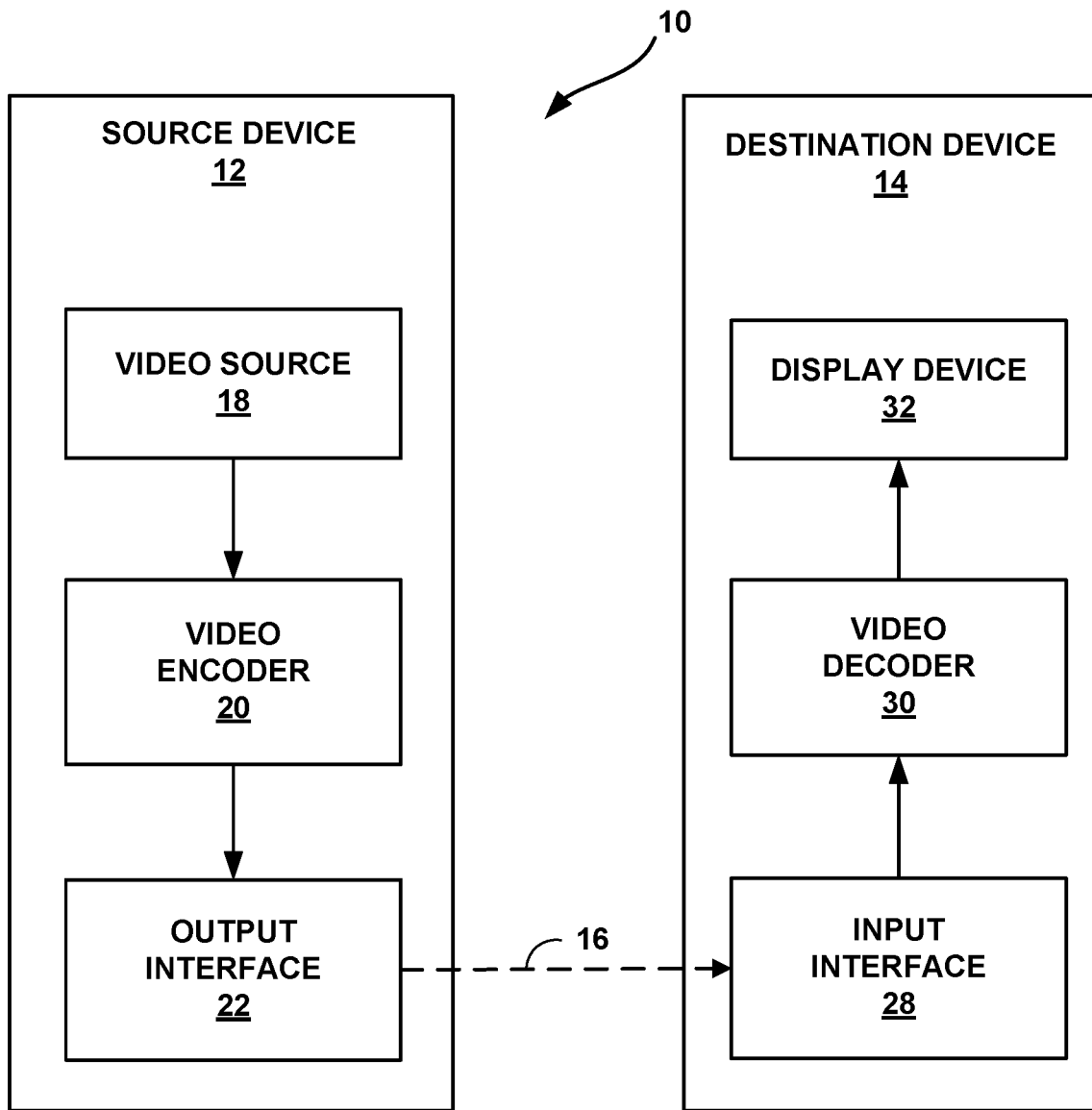
FIG. 1 is a block diagram illustrating an example video encoding and decoding system that may utilize techniques for bi-directional optical flow.

In general, the techniques of this disclosure are related to improvements of bi-directional optical flow (BIO) video coding techniques. More specifically, the techniques of this disclosure are related to inter prediction and motion vector reconstruction of BIO for video coding and to inter prediction refinement based on the BIO. BIO may be applied during motion compensation. In general, BIO is used to modify a motion vector on a per-pixel (e.g., per-sample) basis for a current block, such that pixels of the current block are predicted using corresponding offset values applied to the predictive block. BIO has the effect of creating a new motion vector, but in BIO's actual implementation, the predictive block is modified by adding offsets while the motion vector itself is not actually modified.

The techniques of this disclosure may be applied to any existing video codec, such as those conforming to ITU-T H.264/AVC (Advanced Video Coding) or High Efficiency Video Coding (HEVC), also referred to as ITU-T H.265. H.264 is described in International Telecommunication Union, "Advanced video coding for generic audiovisual services," SERIES H: AUDIOVISUAL AND MULTIMEDIA SYSTEMS, Infrastructure of audiovisual services—Coding of moving video, H.264, June 2011, and H.265 is described in International Telecommunication Union, "High efficiency video coding," SERIES H: AUDIOVISUAL AND MULTIMEDIA SYSTEMS, Infrastructure of audiovisual services—Coding of moving video, April 2015. The techniques of this disclosure may also be applied to any other previous or future video coding standards as an efficient coding tool.

An overview of HEVC is described in G. J. Sullivan, J.-R. Ohm, W.-J. Han, T. Wiegand "Overview of the High Efficiency Video Coding (HEVC) Standard," IEEE Transactions on Circuits and Systems for Video Technology, vol. 22, no. 12. pp. 1649-1668, December 2012. The latest HEVC draft specification is available at http://phenix.int-evry.fr/jct/doc_end_user/documents/14_Vienna/wg11/JCTVC-N1003-v1.zip. The latest version of the Final Draft of International Standard (FDIS) of HEVC is described in JCTVC-L1003_v34, available at http://phenix.it-sudparis.eu/j ct/doc_end_user/documents/12_Geneva/wg11/JCTVC-L1003-v34.zip Other video coding standards include ITU-T H.261, ISO/IEC MPEG-1 Visual, ITU-T H.262 or ISO/IEC MPEG-2 Visual, ITU-T H.263, ISO/IEC MPEG-4 Visual and the Scalable Video Coding (SVC) and Multiview Video Coding (MVC) extensions of H.264, as well as the extensions of HEVC, such as the range extension, multiview extension (MV-HEVC) and scalable extension (SHVC). In April 2015, the Video Coding Experts Group (VCEG) started a new research project which targets a next generation of video coding standard. The reference software is called HM-KTA.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. An algorithm description of Joint Exploration Test Model (JEM) is described in JVET-E1001. A version of reference software, i.e., Joint Exploration Model 5 (JEM 5), J. Chen, E. Alshina, G. J. Sullivan, J.-R. Ohm, J. Boyce, "Algorithm Description of Joint Exploration Test Model 5", JVET-E1001, January 2017, could be downloaded from: https://jvet.hhi.fraunhofer.de/svn/svn_HMJEMSoftware/tags/HM-16.6-JEM-5.0.1/. Another algorithm description of JEM is described in JVET-E1001. The latest version of reference software, i.e., Joint Exploration Model 7 (JEM 7), J. Chen, E. Alshina, G. J. Sullivan, J.-R. Ohm, J. Boyce, "Algorithm Description of Joint Exploration Test Model 5", JVET-G1001, January 2017, could be downloaded from: https://jvet.hhi.fraunhofer.de/svn/svn_HMJEMSoftware/tags/HM-16.6-JEM-7.0/.

Certain video coding techniques, such as those of H.264 and HEVC that are related to the techniques of this disclosure, are described below. Certain techniques of this disclosure may be described with reference to H.264 and/or HEVC to aid in understanding, but the techniques describe are not necessarily limited to H.264 or HEVC and can be used in conjunction with other coding standards and other coding tools.

The following discussion relates to motion information. In general, a picture is divided into blocks, each of which may be predictively coded. Prediction of a current block can generally be performed using intra-prediction techniques (using data from the picture including the current block) or inter-prediction techniques (using data from a previously coded picture relative to the picture including the current block). Inter-prediction includes both uni-directional prediction and bi-directional prediction.

For each inter-predicted block, a set of motion information may be available. A set of motion information may contain motion information for forward and backward prediction directions. Here, forward and backward prediction directions are two prediction directions of a bi-directional prediction mode and the terms "forward" and "backward" do not necessarily have a geometry meaning. Instead, the terms "forward" and "backward" generally correspond to whether the reference pictures are to be displayed before ("backward") or after ("forward") the current picture. In some examples, "forward" and "backward" prediction directions may correspond to reference picture list 0 (RefPicList0) and reference picture list 1 (RefPicList1) of a current picture. When only one reference picture list is available for a picture or slice, only RefPicList0 is available and the motion information of each block of a slice always refers to a picture of RefPicList0 (e.g., is forward).

For each prediction direction, the motion information contains a reference index and a motion vector. In some cases, for simplicity, a motion vector itself may be referred to in a way that it is assumed that the motion vector has an associated reference index. A reference index may be used to identify a reference picture in the current reference picture list (RefPicList0 or RefPicList1). A motion vector has a horizontal (x) and a vertical (y) component. In general, the horizontal component indicates a horizontal displacement within a reference picture, relative to the position of a current block in a current picture, needed to locate an x-coordinate of a reference block, while the vertical component indicates a vertical displacement within the reference picture, relative to the position of the current block, needed to locate a y-coordinate of the reference block.

Picture order count (POC) values are widely used in video coding standards to identify a display order of a picture. Although there are cases in which two pictures within one coded video sequence may have the same POC value, this typically does not happen within a coded video sequence. Thus, POC values of pictures are generally unique, and thus can uniquely identify corresponding pictures. When multiple coded video sequences are present in a bitstream, pictures having the same POC value may be closer to each other in terms of decoding order. POC values of pictures are typically used for reference picture list construction, derivation of reference picture sets as in HEVC, and motion vector scaling.

E. Alshina, A. Alshin, J.-H. Min, K. Choi, A. Saxena, M. Budagavi, "Known tools performance investigation for next generation video coding," ITU—Telecommunications Standardization Sector, STUDY GROUP 16 Question 6, Video Coding Experts Group (VCEG), VCEG-AZ05, June. 2015, Warsaw, Poland (hereinafter, "Alshina 1"), and A. Alshina, E. Alshina, T. Lee, "Bi-directional optical flow for improving motion compensation," Picture Coding Symposium (PCS), Nagoya, Japan, 2010 (hereinafter, "Alshina 2") described a method called bi-directional optical flow (BIO).

BIO is based on pixel level optical flow. According to Alshina 1 and Alshina 2, BIO is only applied to blocks that have both forward and backward prediction. BIO as described in Alshina 1 and Alshina 2 is summarized below:

Given a pixel (e.g., a luma sample or a chroma sample) value $I_t$ at time t, its first order Taylor expansion is $$I_t = I_{t0} + \frac{\partial I_{t0}}{\partial t}(t - t0) \tag{A}$$

$I_{t0}$ is on the motion trajectory of $I_t$. That is, the motion from $I_{t0}$ to $I_t$ is considered in the formula.

Under the assumption of optical flow:

$$0 = \frac{dI}{dt} = \frac{\partial I}{\partial t} + \frac{\partial I}{\partial x} \cdot \frac{\partial x}{\partial t} + \frac{\partial I}{\partial y} \cdot \frac{\partial y}{\partial t}$$

$$\frac{\partial I}{\partial t} = -\frac{\partial I}{\partial x} \cdot \frac{\partial x}{\partial t} - \frac{\partial I}{\partial y} \cdot \frac{\partial y}{\partial t}$$

let $$G_x = \frac{\partial I}{\partial x}, G_y = \frac{\partial I}{\partial y}$$

(gradient), and equation (A) becomes $$I_t = I_{t0} - G_{x0} \cdot \frac{\partial x}{\partial t} \cdot (t - t_0) - G_{y0} \cdot \frac{\partial y}{\partial t} \cdot (t - t_0) \tag{B}$$

Regarding $$\frac{\partial x}{\partial t} \text{ and } \frac{\partial y}{\partial t}$$

as me moving speed, $V_{x0}$ and $V_{y0}$ may be used to represent them.

So, equation (B) becomes $$I_t = I_{t0} - G_{x0} \cdot V_{x0} \cdot (t-t_0) - G_{y0} \cdot V_{y0} \cdot (t-t_0) \tag{C}$$

Suppose, as an example, a forward reference at $t_0$ and a backward reference at $t_1$, and $$t_0 - t = t - t_1 = \Delta t = 1$$

This leads to:

$$I_t = I_{t0} - G_{x0} \cdot V_{x0} \cdot (t - t_0) - G_{y0} \cdot V_{y0} \cdot (t - t_0) \tag{D}$$
$$= I_{t0} + G_{x0} \cdot V_{x0} + G_{y0} \cdot V_{y0}$$

$$I_t = I_{t1} - G_{x1} \cdot V_{x1} \cdot (t - t_1) - G_{y1} \cdot V_{y1} \cdot (t - t_1)$$
$$= I_{t1} - G_{x1} \cdot V_{x1} - G_{y1} \cdot V_{y1}$$

$$I_t = \frac{I_{t0} + I_{t1}}{2} + \frac{(G_{x0} \cdot V_{x0} - G_{x1} \cdot V_{x1}) + (G_{y0} \cdot V_{y0} - G_{y1} \cdot V_{y1})}{2}$$

It is further assumed $V_{x0} = V_{x1} = V_x$ and $V_{y0} = V_{y1} = V_y$ since the motion is along the trajectory. So, equation (D) becomes $$I_t = \frac{I_{t0} + I_{t1}}{2} + \frac{(G_{x0} - G_{x1}) \cdot V_x + (G_{y0} - G_{y1}) \cdot V_y}{2} \quad (E)$$

$$= \frac{I_{t0} + I_{t1}}{2} + \frac{\Delta G_x \cdot V_x + \Delta G_y \cdot V_y}{2}$$

where $\Delta G_x = G_{x0} - G_{x1}$, $\Delta G_y = G_{y0} - G_{y1}$ can be calculated based on reconstructed references. Since $$\frac{I_{t0} + I_{t1}}{2}$$

is the regular bi-prediction, $$\frac{\Delta G_x \cdot V_x + \Delta G_y \cdot V_y}{2}$$

is called BIO offset hereafter for convenience.

$V_x$ and $V_y$ are derived at both encoder and decoder by minimizing the following distortion:

$$\min \left\{ \sum_{block} ((I_{t0} + G_{x0} \cdot V_x + G_{y0} \cdot V_y) - (I_{t1} - G_{x1} \cdot V_x - G_{y1} \cdot V_y))^2 \right\} =$$

$$\min \left\{ \sum_{block} (\Delta I + (G_{x0} + G_{x1}) \cdot V_x + (G_{y0} + G_{y1}) \cdot V_y)^2 \right\}$$

With derived $V_x$ and $V_y$, the final prediction of the block is calculated with (E). $V_x$ and $V_y$ is called "BIO motion" for convenience.

In general, a video coder performs BIO during motion compensation. That is, after the video coder determines a motion vector for a current block, the video coder produces a predicted block for the current block using motion compensation with respect to the motion vector. In general, the motion vector identifies the location of a reference block with respect to the current block in a reference picture. When performing BIO, a video coder modifies the motion vector on a per-pixel basis for the current block. That is, rather than retrieving each pixel of the reference block as a block unit, according to BIO, the video coder determines per-pixel modifications to the motion vector for the current block and constructs the reference block such that the reference block includes reference pixels identified by the motion vector and the per-pixel modification for the corresponding pixel of the current block. Thus, BIO may be used to produce a more accurate reference block for the current block.

FIG. 1 is a block diagram illustrating an example video encoding and decoding system 10 that may utilize techniques for bi-directional optical flow. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may be any type of medium or device capable of moving the encoded video data from source device 12 to destination device 14. In one example, computer-readable medium 16 may be a communication medium to enable source device 12 to transmit encoded video data directly to destination device 14 in real-time. The encoded video data may be modulated according to a communication standard, such as a wireless communication protocol, and transmitted to destination device 14. The communication medium may be any wireless or wired communication medium (or combination thereof), such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for bi-directional optical flow. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for bi-directional optical flow may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of the video data. Display device 32 displays the decoded video data to a user and may be any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. In some examples, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may include a coding tree block of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, the CU may be further partitioned into 2 or 4 prediction units (PUs) or become just one PU when further partition does not apply. When two PUs are present in one CU, the PUs can be half size rectangles or two rectangles with sizes ¼ and ¾ the size of the CU.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU. When the CU is inter coded, one set of motion information may be present for each PU. In addition, each PU may be coded with a unique inter-prediction mode to derive the set of motion information.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may include a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In accordance with the techniques of this disclosure, video encoder 20 and/or video decoder 30 may further perform bi-directional optical flow (BIO) techniques during motion compensation as discussed in greater detail below.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may include an integrated circuit, a microprocessor, and/or a wireless communication device, such as a cellular telephone.

Figure 2:
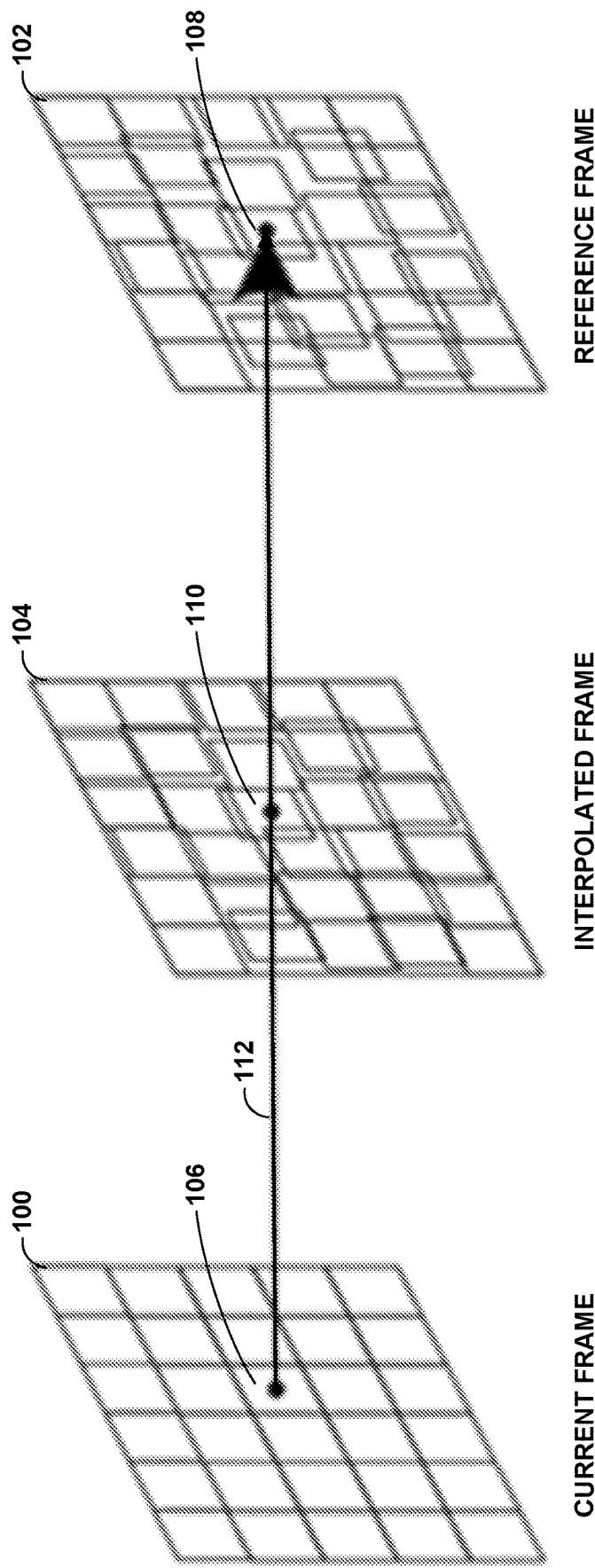
FIG. 2 is a conceptual diagram illustrating an example of unilateral motion estimation (ME) as a block-matching algorithm (BMA) performed for motion compensated frame-rate up-conversion (MC-FRUC).

FIG. 2 is a conceptual diagram illustrating an example of unilateral motion estimation (ME) as a block-matching algorithm (BMA) performed for motion compensated frame-rate up-conversion (MC-FRUC). In general, a video coder (such as video encoder 20 or video decoder 30) performs unilateral ME to obtain motion vectors (MVs), such as MV 112, by searching for the best matching block (e.g., reference block 108) from reference frame 102 for current block 106 of current frame 100. Then, the video coder interpolates an interpolated block 110 along the motion trajectory of motion vector 112 in interpolated frame 104. That is, in the example of FIG. 2, motion vector 112 passes through midpoints of current block 106, reference block 108, and interpolated block 110.

As shown in FIG. 2, three blocks in three frames are involved following the motion trajectory. Although current block 106 in current frame 100 belongs to a coded block, the best matching block in reference frame 102 (that is, reference block 108) need not fully belong to a coded block (that is, the best matching block might not fall on a coded block boundary, but instead, may overlap such a boundary). Likewise, interpolated block 110 in interpolated frame 104 need not fully belong to a coded block. Consequently, overlapped regions of the blocks and un-filled (holes) regions may occur in interpolated frame 104.

To handle overlaps, simple FRUC algorithms merely involve averaging and overwriting the overlapped pixels. Moreover, holes may be covered by the pixel values from a reference or a current frame. However, these algorithms may result in blocking artifacts and blurring. Hence, motion field segmentation, successive extrapolation using the discrete Hartley transform, and image inpainting may be used to handle holes and overlaps without increasing blocking artifacts and blurring.

Figure 3:
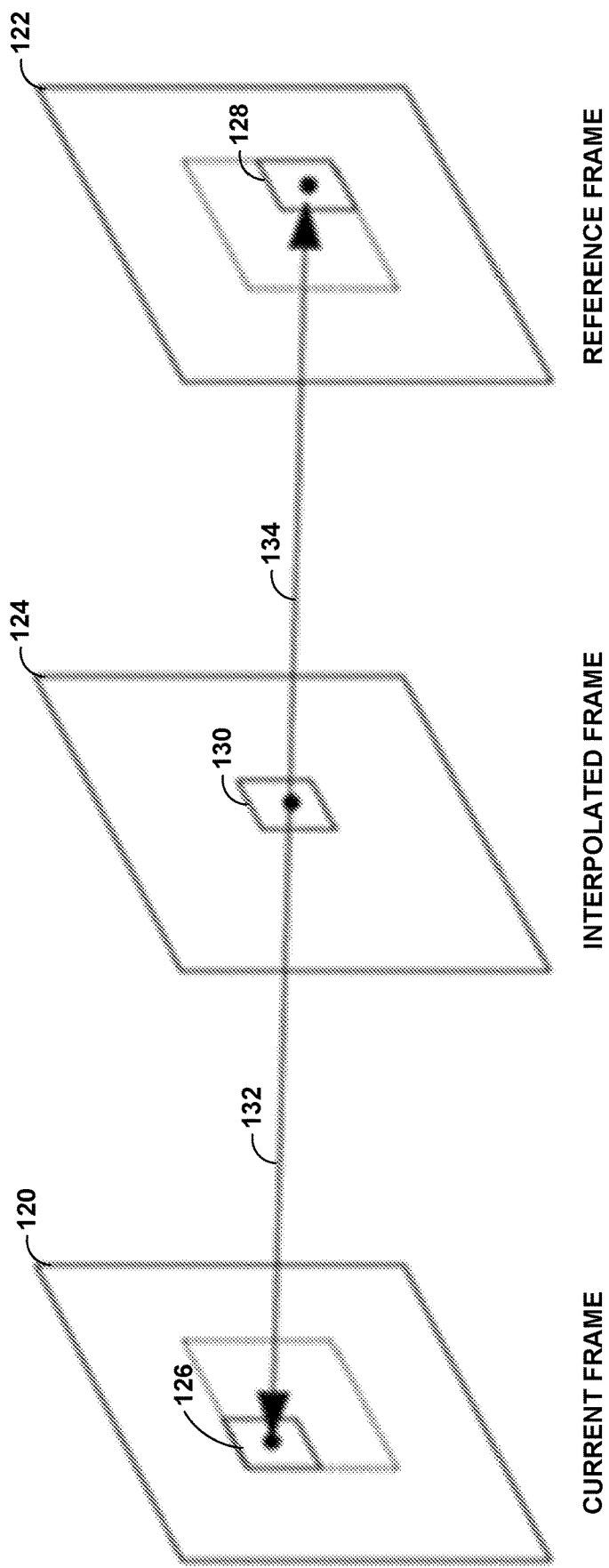
FIG. 3 is a conceptual diagram illustrating an example of bilateral ME as a BMA performed for MC-FRUC.

FIG. 3 is a conceptual diagram illustrating an example of bilateral ME as a BMA performed for MC-FRUC. Bilateral ME is another solution (in MC-FRUC) that can be used to avoid the problems caused by overlaps and holes. A video coder (such as video encoder 20 and/or video decoder 30) performing bilateral ME obtains MVs 132, 134 passing through interpolated block 130 of interpolated frame 124 (which is intermediate to current frame 120 and reference frame 122) using temporal symmetry between current block 126 of current frame 120 and reference block 128 of reference frame 122. As a result, the video coder does not generate overlaps and holes in interpolated frame 124. Since it is assumed that current block 126 is a block that the video coder processes in a certain order, e.g., as in the case of video coding, a sequence of such blocks would cover the whole intermediate picture without overlap. For example, in the case of video coding, blocks can be processed in the decoding order. Therefore, such a method may be more suitable if FRUC ideas can be considered in a video coding framework.

S.-F. Tu, O. C. Au, Y. Wu, E. Luo and C.-H. Yeun, "A Novel Framework for Frame Rate Up Conversion by Predictive Variable Block-Size Motion Estimated Optical Flow," International Congress on Image Signal Processing (CISP), 2009 described a hybrid block-level motion estimation and pixel-level optical flow method for frame rate up-conversion. Tu stated that the hybrid scene was better than either individual method.

In the HEVC standard, there are two inter prediction modes, named merge (with skip mode considered as a special case of merge) and advanced motion vector prediction (AMVP) modes respectively for a PU. In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

A merge candidate corresponds to a full set of motion information while an AMVP candidate contains just one motion vector for a specific prediction direction/reference list and reference index. The candidates for both modes are derived similarly from the same spatial and temporal neighboring blocks.

Figure 4B:
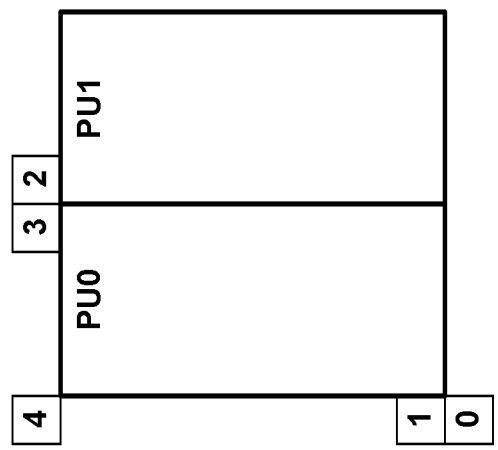
FIG. 4B shows spatial neighboring MV candidates for AMVP modes.
Figure 4A:
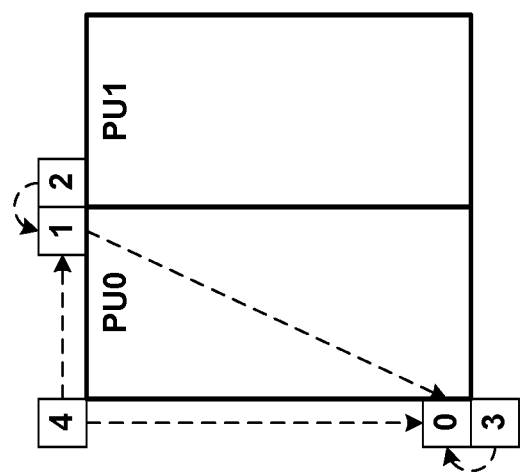
FIG. 4A shows spatial neighboring MV candidates for merge mode.

FIG. 4A shows spatial neighboring MV candidates for merge mode, and FIG. 4B shows spatial neighboring MV candidates for AMVP modes. Spatial MV candidates are derived from the neighboring blocks shown in FIGS. 4A and 4B, for a specific PU (PU$_0$), although the methods generating the candidates from the blocks differ for merge and AMVP modes.

In merge mode, up to four spatial MV candidates can be derived with the orders showed on FIG. 4A with numbers, and the order is the following: left (0, A1), above (1, B1), above right (2, B0), below left (3, A0), and above left (4, B2), as shown in FIG. 4A.

In AVMP mode, the neighboring blocks are divided into two groups: left group consisting of the block 0 and 1, and above group consisting of the blocks 2, 3, and 4 as shown on FIG. 4B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 5B:
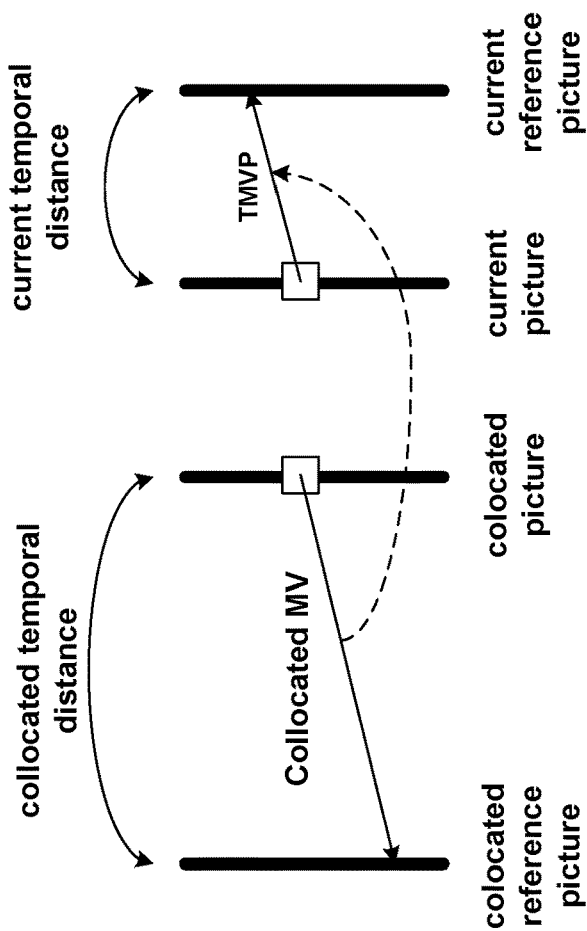
FIG. 5B shows an example of MV scaling.
Figure 5A:
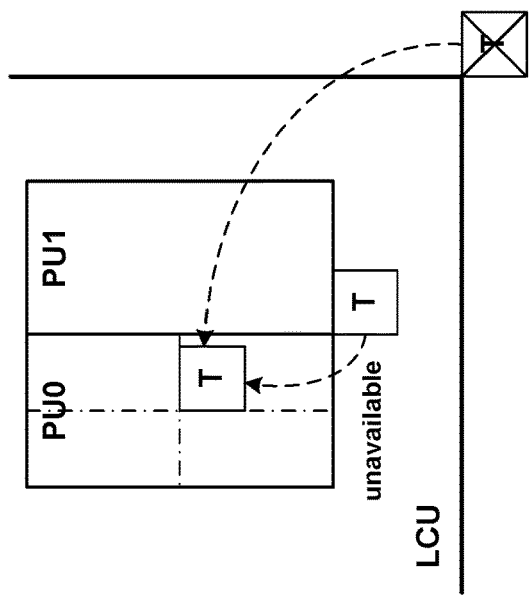
FIG. 5A shows an example of a TMVP candidate.

FIG. 5A shows an example of a TMVP candidate, and FIG. 5B shows an example of MV scaling. Temporal motion vector predictor (TMVP) candidate, if enabled and available, is added into the MV candidate list after spatial motion vector candidates. The process of motion vector derivation for TMVP candidate is the same for both merge and AMVP modes, however the target reference index for the TMVP candidate in the merge mode is always set to 0.

The primary block location for TMVP candidate derivation is the bottom right block outside of the collocated PU as shown in FIG. 5A as a block "T", to compensate the bias to the above and left blocks used to generate spatial neighboring candidates. However, if that block is located outside of the current CTB row or motion information is not available, the block is substituted with a center block of the PU.

Motion vector for TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV need to be scaled to compensate the temporal distance differences, as shown in FIG. 5B.

HEVC also utilizes motion vector scaling. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated, and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

HEVC also utilizes artificial motion vector candidate generation. If a motion vector candidate list is not complete, artificial motion vector candidates are generated and inserted at the end of the list until the motion vector candidate list has a full set of candidates. In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

HEVC also utilizes a pruning process for candidate insertion. Candidates from different blocks may happen to be the same, which decreases the efficiency of a merge/AMVP candidate list. A pruning process may be applied to solve this problem. It compares one candidate against the others in the current candidate list to avoid inserting identical candidate in certain extent. To reduce the complexity, only limited numbers of pruning process is applied instead of comparing each potential one with all the other existing ones.

Figure 6:
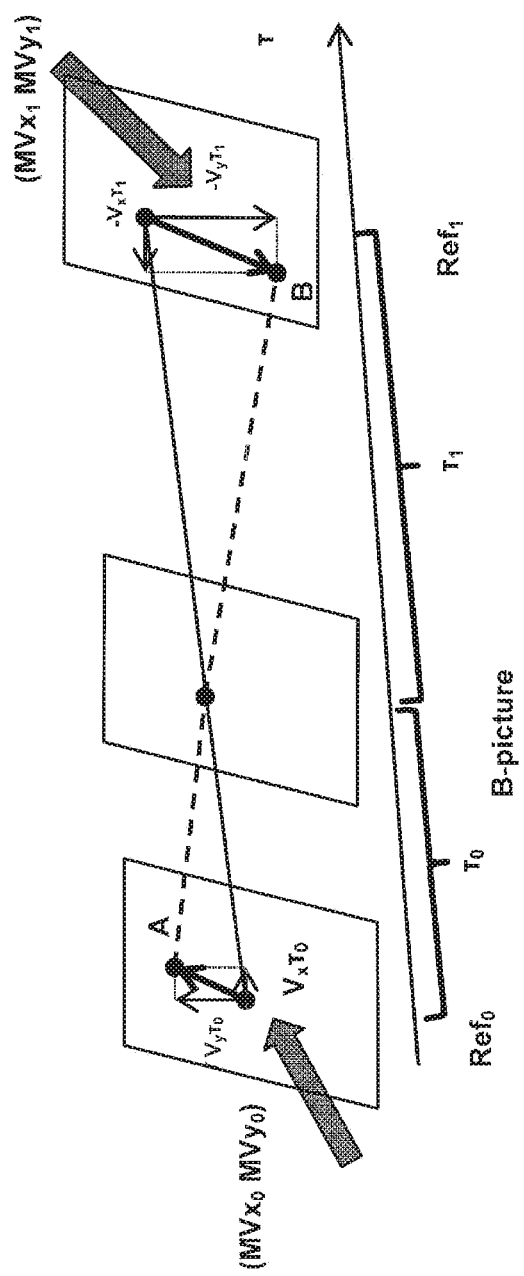
FIG. 6 shows an example of optical flow trajectory.

Aspects of bi-directional optical flow in JEM will now be described. FIG. 6 shows an example of optical flow trajectory. BIO utilizes pixel-wise motion refinement which is performed on top of block-wise motion compensation in a case of bi-prediction. As it compensates the fine motion can inside the block enabling BIO results in enlarging block size for motion compensation. Sample-level motion refinement does not require exhaustive search or signaling since there is explicit equation which gives fine motion vector for each sample.

Let $I^{(k)}$ be luminance value from reference k (k=0, 1) after compensation block motion, and $\partial I^{(k)}/\partial x$, $\partial I^{(k)}/\partial y$ are horizontal and vertical components of the $I^{(k)}$ gradient respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0. \quad (1)$$

Combining optical flow equation with Hermite interpolation for motion trajectory of each sample one gets a unique polynomial of third order which matches both function values $I^{(k)}$ and derivatives $\partial I^{(k)}/\partial x$, $\partial I^{(k)}/\partial y$ at the ends. The value of this polynomial at t=0 is BIO prediction:

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (2)$$

Here $\tau_0$ and $\tau_1$ denote the distance to reference frames as shown on a FIG. 6. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (both from the past or both from the future) then signs are different $\tau_0 \cdot \tau_1 < 0$. In this case BIO is applied only if prediction come not from the same time moment ($\tau_0 \neq \tau_1$), both referenced regions have non-zero motion ($MVx_0, MVy_0, MVx_1, MVy_1 \neq 0$) and block motion vectors are proportional to the time distance ($MVx_0/MVx_1 = MVy_0/MVy_1 = -\tau_0/\tau_1$).

The motion vector field $(v_x, v_y)$ is determined by minimizing the difference $\Delta$ between values in points A and B (intersection of motion trajectory and reference frame planes on FIG. 6). Model uses only first linear term of local Taylor expansion for $\Delta$:

$$\Delta = (I^{(0)} - I^{(1)}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (3)$$

All values in (1) depend on sample location (i', j'), which was omitted so far. Assuming the motion is consistent in local surrounding, the $\Delta$ inside (2M+1)×(2M+1) square window $\Omega$ centered in currently predicted point (i,j) may be minimized:

$$(v_x, v_y) = \underset{v_x, v_y}{\operatorname{argmin}} \sum_{[i', j'] \in \Omega} \Delta^2[i', j'] \quad (4)$$

For this optimization problem, a simplified solution making first minimization in vertical and then in horizontal directions may be used, which results in:

$$v_x = (s_1 + r) > m ?\ \operatorname{clip3}\left(-thBIO, thBIO, -\frac{s_3}{(s_1 + r)}\right) : 0 \quad (5)$$

$$v_y = (s_5 + r) > m ?\ \operatorname{clip3}\left(-thBIO, thBIO, -\frac{s_6 - v_x s_r/2}{(s_5 + r)}\right) : 0 \quad (6)$$

where,

-continued $$s_1 = \sum_{[i',j]\in\Omega} (\tau_1\partial I^{(1)}/\partial x + \tau_0\partial I^{(0)}/\partial x)^2; \quad (7)$$

$$s_3 = \sum_{[i',j]\in\Omega} (I^{(1)} - I^{(0)})(\tau_1\partial I^{(1)}/\partial x + \tau_0\partial I^{(0)}/\partial x);$$

$$s_2 = \sum_{[i',j]\in\Omega} (\tau_1\partial I^{(1)}/\partial x + \tau_0\partial I^{(0)}/\partial x)(\tau_1\partial I^{(1)}/\partial y + \tau_0\partial I^{(0)}/\partial y);$$

$$s_5 = \sum_{[i',j]\in\Omega} (\tau_1\partial I^{(1)}/\partial y + \tau_0\partial I^{(0)}/\partial y)^2;$$

$$s_6 = \sum_{[i',j]\in\Omega} (I^{(1)} - I^{(0)})(\tau_1\partial I^{(1)}/\partial y + \tau_0\partial I^{(0)}/\partial y)$$

In order to avoid division by zero or very small value, regularization parameters r and m are introduced in equations (2), (3).

$$r = 500 \cdot 4^{d-8} \quad (8)$$

$$m = 700 \cdot 4^{d-8} \quad (9)$$

Here d is the internal bit-depth of the input video.

In some cases, MV regiment of BIO might be unreliable due to noise or irregular motion. Therefore, in BIO, the magnitude of MV regiment is clipped to the certain threshold (thBIO). The threshold value is determined based on whether all the reference pictures of the current picture are all from one direction. If all the reference pictures of the current pictures of the current picture are from one direction, the value of the threshold is set to $12\times2^{14-d}$, otherwise, it is set to $12\times2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

Figure 7:
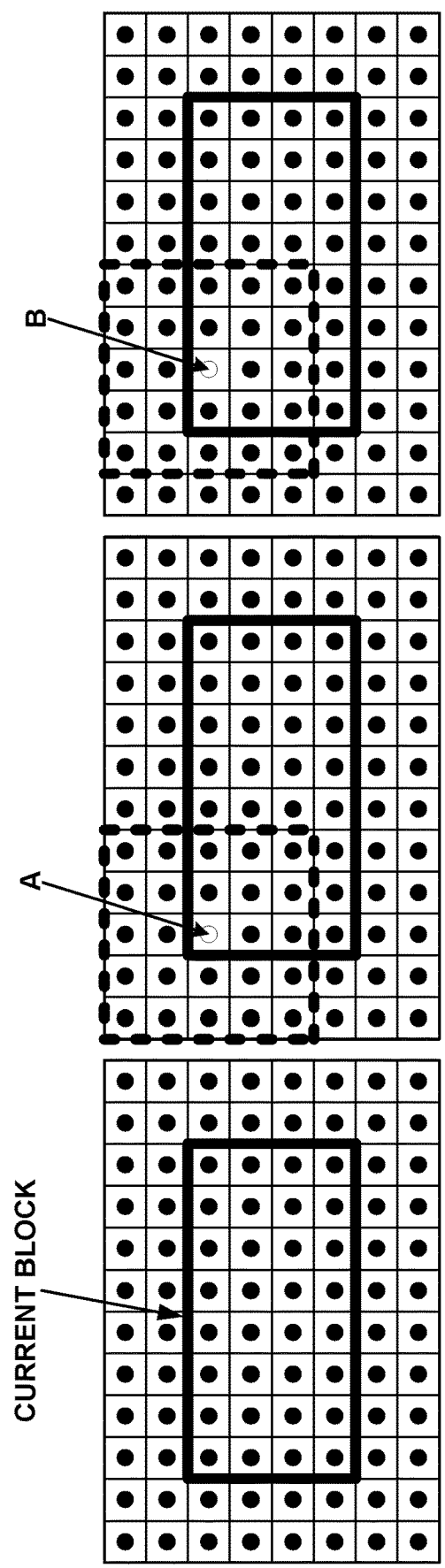
FIG. 7 shows an example of BIO for an 8×4 block.

FIG. 7 shows an example of the gradient calculation for an 8×4 block. For an 8×4 blocks, it needs to fetch the motion compensated predictors (also referred to as MC predictors) and calculate the HOR/VER gradients of all the pixels within current block as well as the outer two lines of pixels because solving vx and vy for each pixel needs the HOR/VER gradient values and motion compensated predictors of the pixels within the window SZ centered in each pixel as shown in equation (4). In JEM, the size of this window is set to 5×5, meaning a video coder therefore needs to fetch the motion compensated predictors and calculate the gradients for the outer two lines of pixels.

TABLE 1

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {1, −7, 38, 38, −7, 1} |

In JEM, BIO is applied to all bi-directional predicted blocks when the two predictions are from different reference pictures. When LIC is enabled for a CU, BIO is disabled.

At the 5th JVET meeting, a proposal JVET-E0028, A. Alshin, E. Alshina, "EE3: bi-directional optical flow w/o block extension", JVET-E0028, January 2017, was submitted to modify the BIO operations and reduce the memory access bandwidth. In this proposal, no MC predictors and gradient values are needed for the pixels outside the current block. Moreover, the solving of $v_x$ and $v_y$ for each pixel is modified to using the MC predictors and the gradient values of all the pixels within current block as shown in FIG. 7. In other word, the square window $\Omega$ in equation (4) is modified to a window which is equal to current CU. Besides, a weighting factor w(i',j') is considered for deriving vx and vy. The w(i',j') is a function of the position of the center pixel (i,j) and the positions of the pixels (i',j') within the window.

$$s_1 = \sum_{[i',j']\in\Omega} w(i',j')(\tau_1\partial I^{(1)}/\partial x + \tau_0\partial I^{(0)}/\partial x)^2; \quad (10)$$

$$s_3 = \sum_{[i',j']\in\Omega} w(i',j')(I^{(i)} - I^{(0)})(\tau_1\partial I^{(1)}/\partial x + \tau_0\partial I^{(0)}/\partial x);$$

$$s_2 = \sum_{[i',j]\in\Omega} w(i',j')$$

$$(\tau_1\partial I^{(1)}/\partial x + \tau_0\partial I^{(0)}/\partial x)(\tau_1\partial I^{(1)}/\partial y + \tau_0\partial I^{(0)}/\partial y);$$

$$s_5 = \sum_{[i',j]\in\Omega} w(i',j')(\tau_1\partial I^{(1)}/\partial y + \tau_0\partial I^{(0)}/\partial y)^2;$$

$$s_6 = \sum_{[i',j]\in\Omega} w(i',j')(I^{(1)} - I^{(0)})(\tau_1\partial I^{(1)}/\partial y + \tau_0\partial I^{(0)}/\partial y)$$

Figure 8:
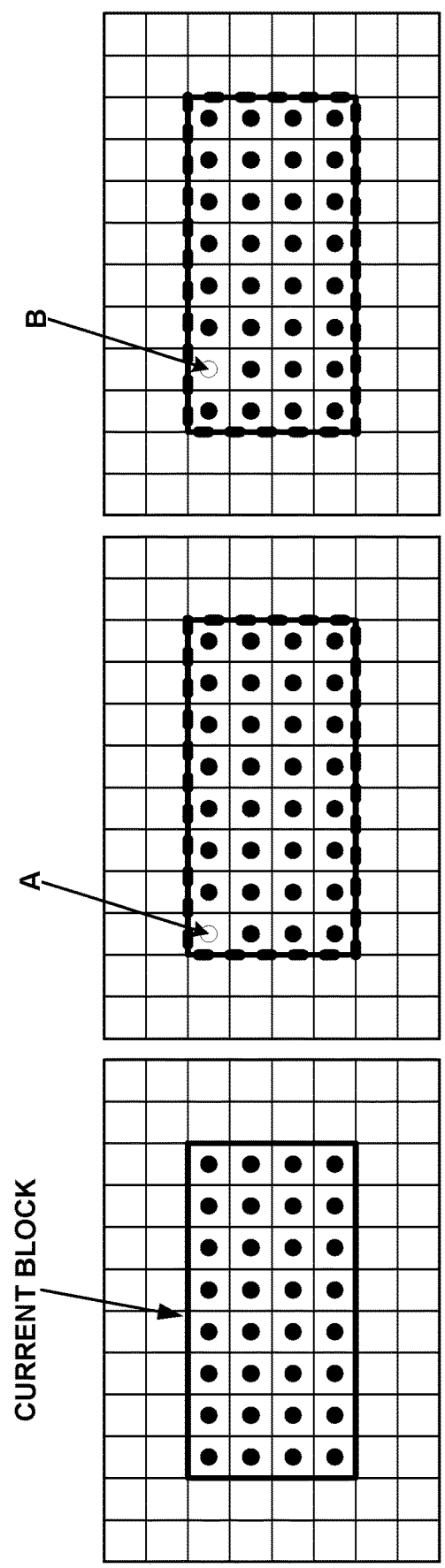
FIG. 8 shows an example of modified BIO for an 8×4 block.

FIG. 8 shows an example of modified BIO for 8×4 block proposed in JVET-E0028. A simplified version of JVET-E0028 has been proposed to address the issue of mismatch in the outcomes between block-level and sub-block level BIO processes. Instead of using the neighborhood Ω with all pixels in CU, the proposed method modifies the neighborhood Ω to include only 5×5 pixels centered at the current pixel without any interpolation or gradient calculation for pixel locations outside of the current CU.

Figure 9A:
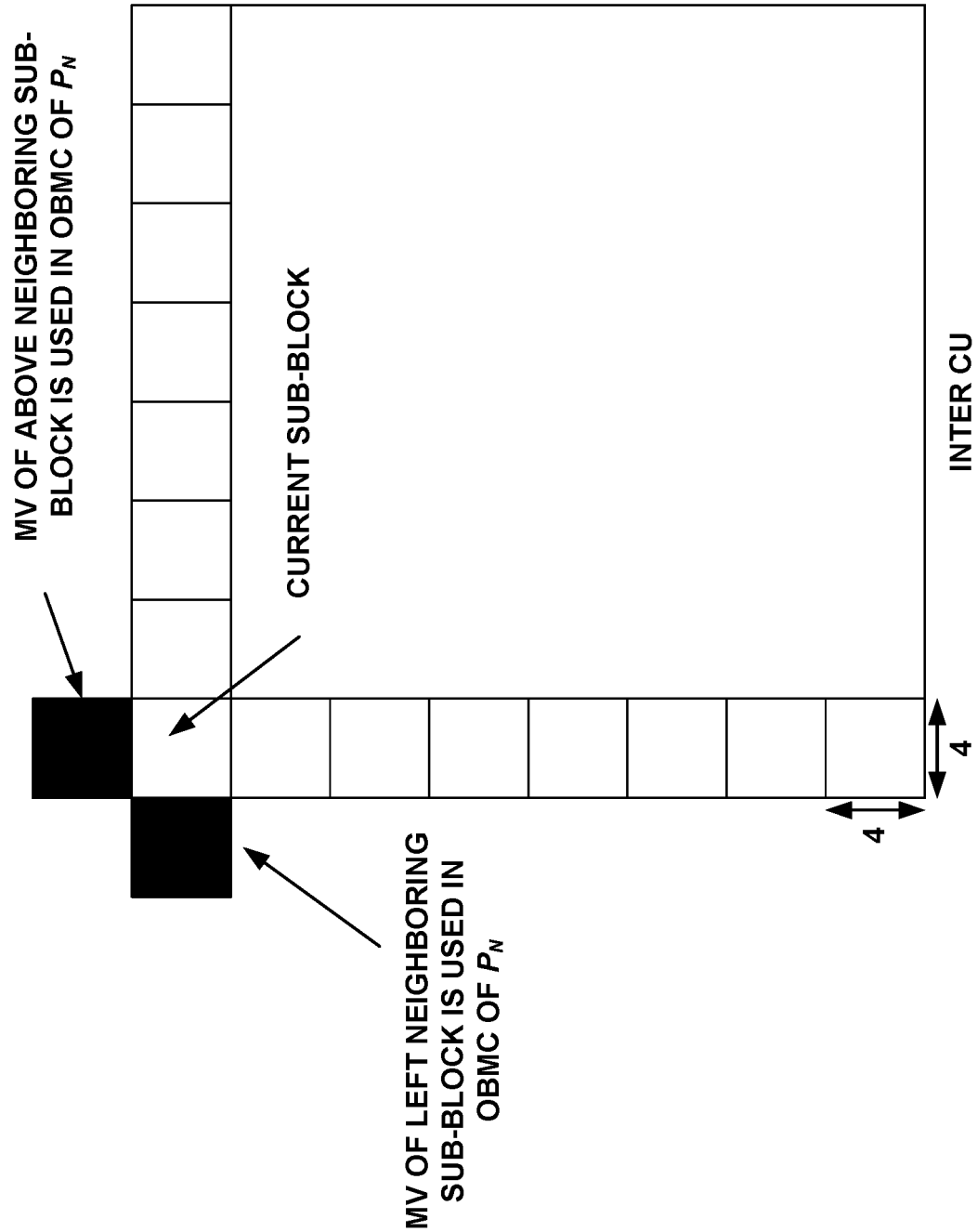
FIGS. 9A and 9B show examples of sub-blocks where OBMC applies.
Figure 9B:
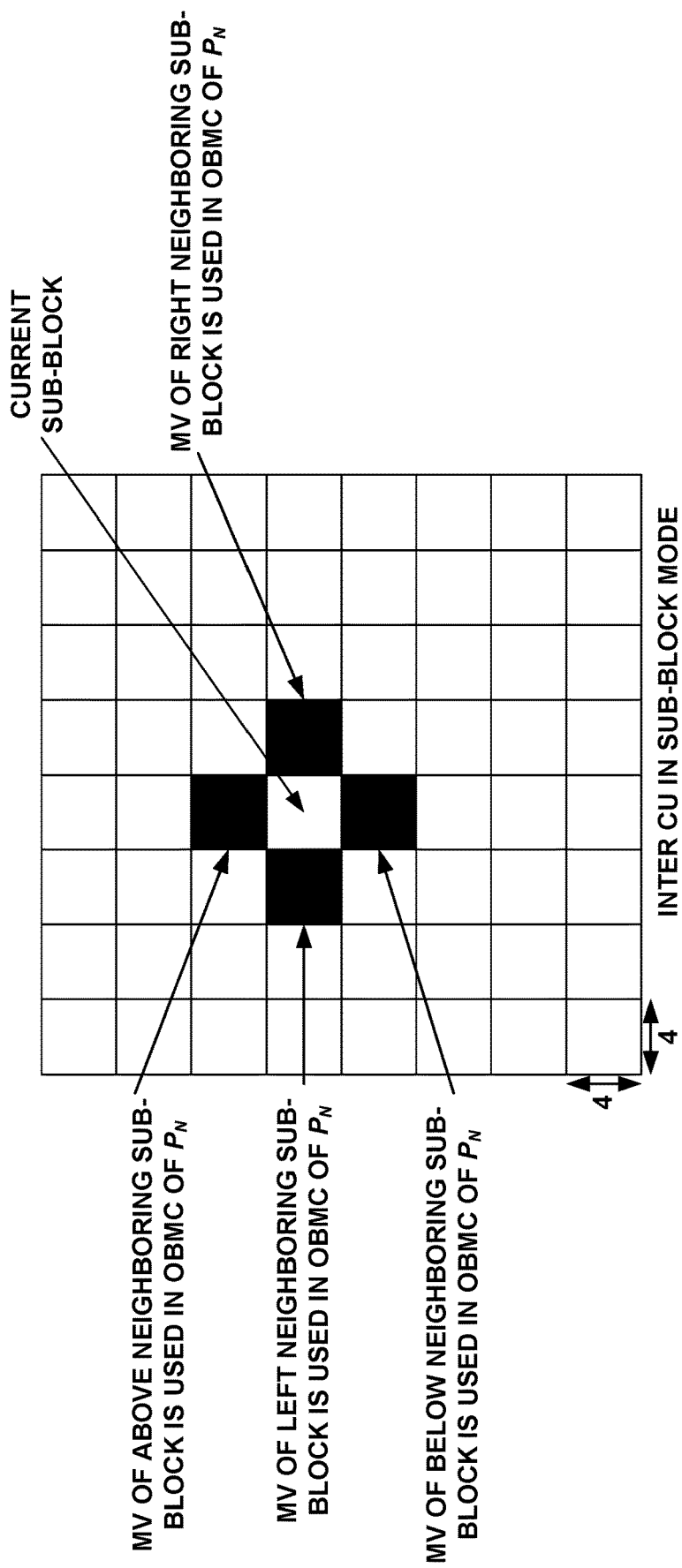
Figure 10A:
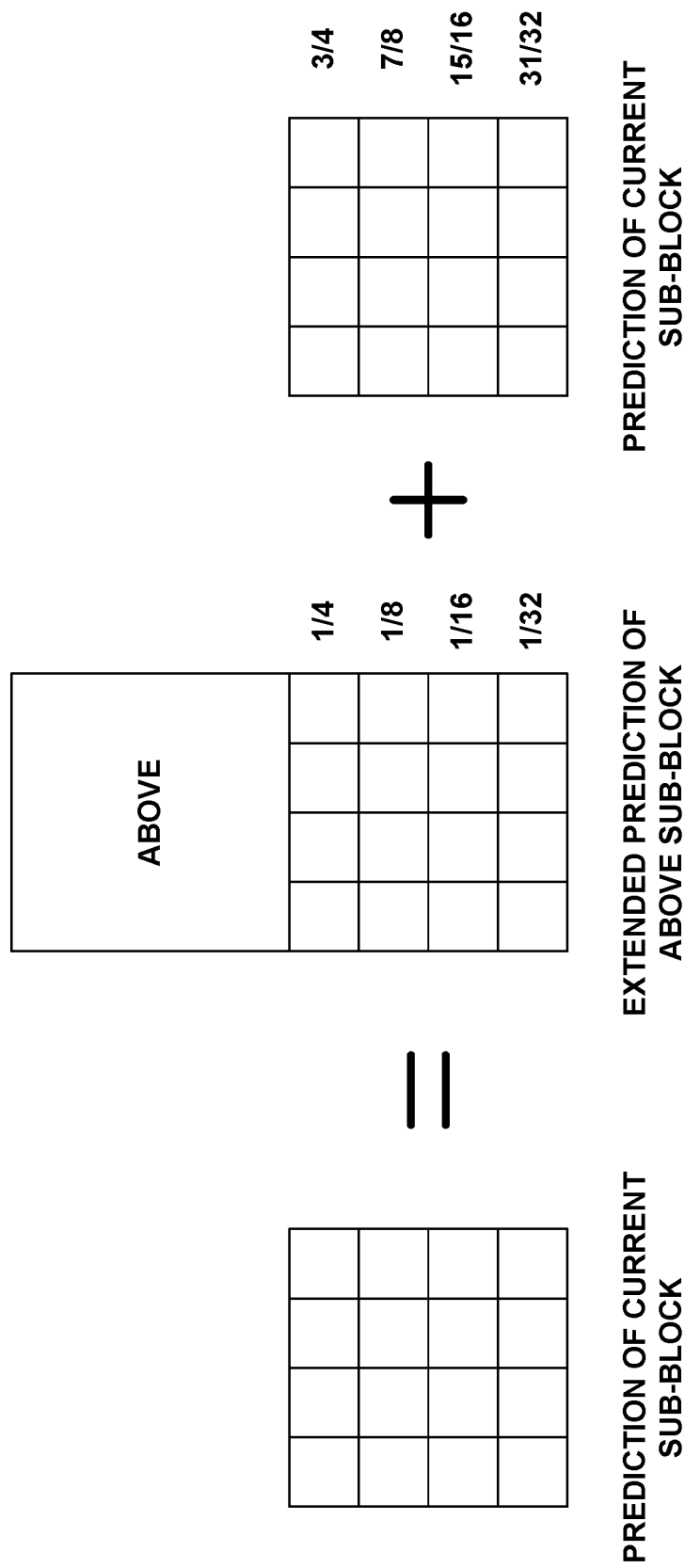
FIGS. 10A-10D show examples of OBMC weightings.
Figure 10B:
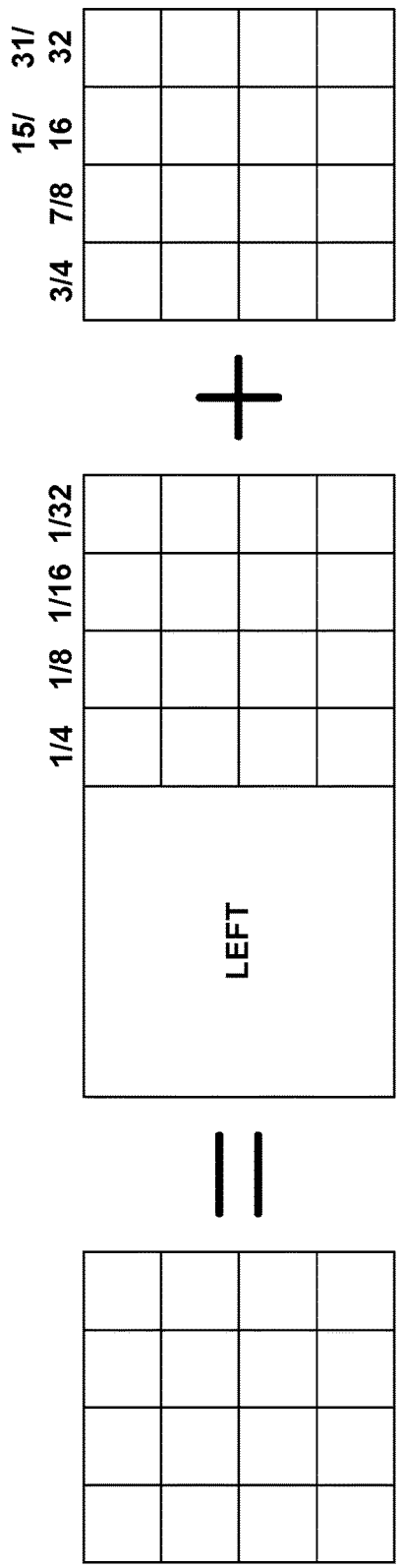
Figure 10C:
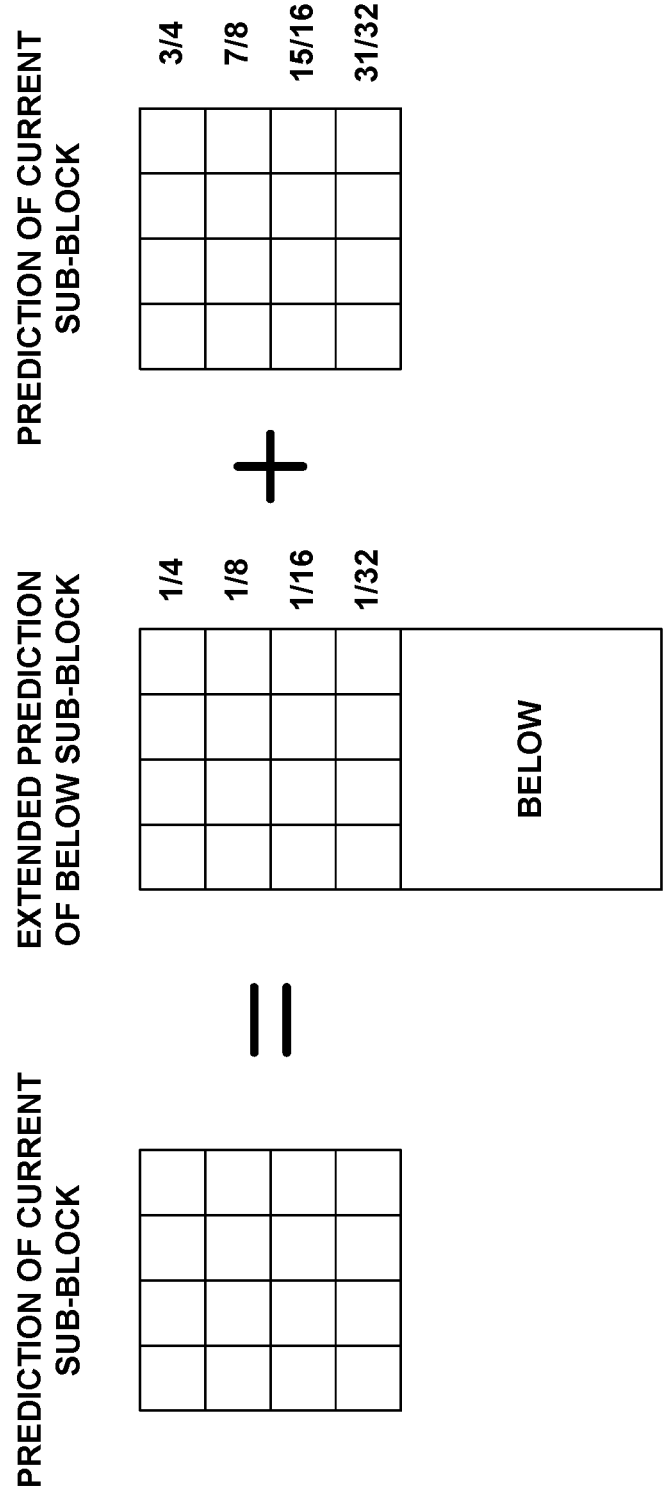
Figure 10D:
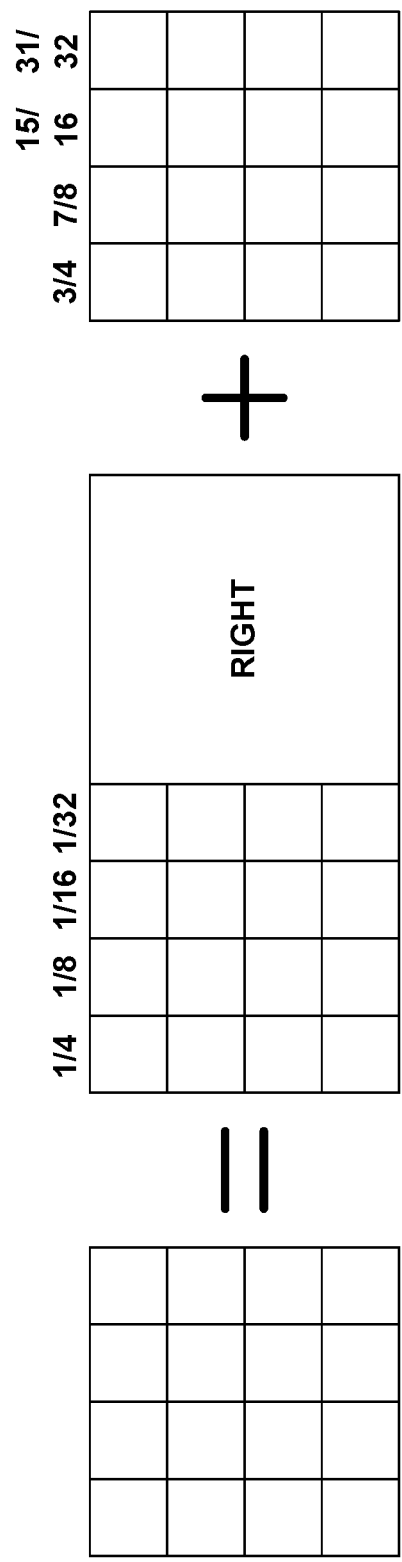

Aspects of Overlapped Block Motion Compensation (OBMC) in JEM will now be described. OBMC has been used for early generations of video standards, e.g., as in H.263. In JEM, OBMC is performed for all Motion Compensated (MC) block boundaries except the right and bottom boundaries of a CU. Moreover, it is applied for both luma and chroma components. In JEM, a MC block is corresponding to a coding block. When a CU is coded with sub-CU mode (includes sub-CU merge, Affine, and FRUC mode), each sub-block of the CU is a MC block. To process CU boundaries in a uniform fashion, OBMC is performed at sub-block level for all MC block boundaries, where sub-block size is set equal to 4×4, as illustrated in FIG. 9.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

As shown in FIG. 10, prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every pixel of $P_N$ is added to the same pixel in $P_C$, i.e., four rows/columns of $P_N$ are added to $P_C$. The weighting factors $\{1/4, 1/8, 1/16, 1/32\}$ are used for $P_N$ and the weighting factors $\{3/4, 7/8, 15/16, 31/32\}$ are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors $\{1/4, 1/8\}$ are used for $P_N$ and weighting factors $\{3/4, 7/8\}$ are used for $P_C$. For $P_N$ generated based on motion vectors of vertically (horizontally) neighbouring sub-block, pixels in the same row (column) of $P_N$ are added to $P_C$ with a same weighting factor. It is noted that BIO is also applied for the derivation of the prediction block Pn.

In JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At video encoder 20, when OBMC is applied for a CU, its impact is taken into account during motion estimation stage. The prediction signal by using motion information of the top neighboring block and the left neighboring block is used to compensate the top and left boundaries of the original signal of the current CU, and then the normal motion estimation process is applied.

BIO can be considered as a post-processing of the regular CU-level or sub-block level MC. While existing BIO implementations offer some coding performance improvements, existing implementations also present complexity issues for both software and hardware designs.

Figure 11:
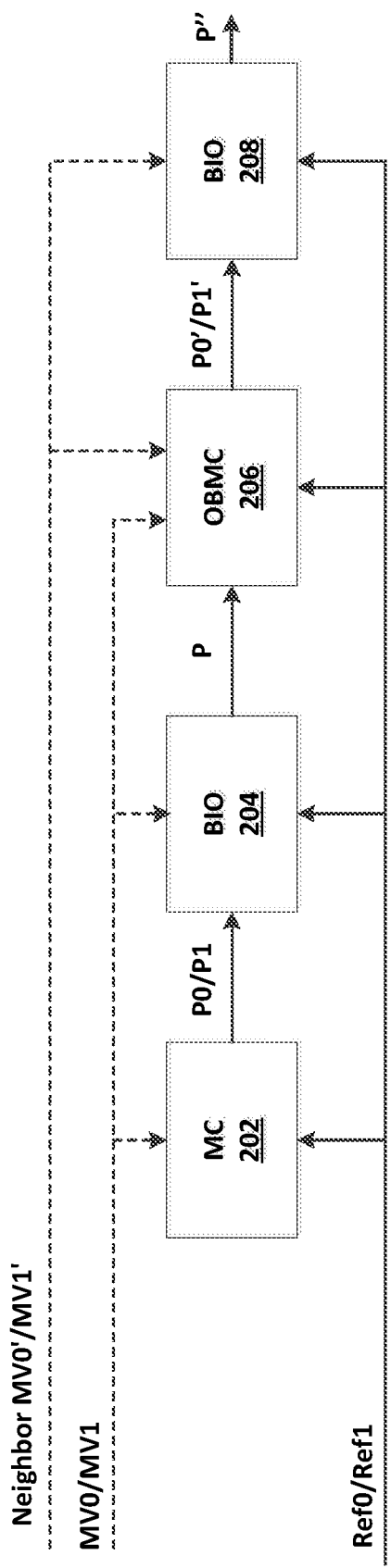
FIG. 11 shows an example of the overall MC process in JEM 5.

FIG. 11 shows a block diagram of the existing BIO design in JEM 5. In FIG. 11, MC 202 performs bi-predictive motion compensation for a block using two motion vectors (MV0 and MV1) and two reference pictures (Ref0 and Ref1). MC 202 outputs two predictive blocks (predictors P0 and P1) to BIO 204 which performs a BIO process on the two predictors to generate output P, which corresponds to a bi-average of P0/P1 with added BIO offsets on a per-pixel basis. OBMC 206 performs OBMC on P to produce two updated predictive blocks (P0' and P1'). BIO 208 then performs a BIO process on the two updated predictors to generate output P''', which is the final predictor.

In the example of FIG. 11, bi-predictive motion compensation is followed by BIO filtering for both regular MC and OBMC, and hence, BIO processes are invoked multiple times for the same sub-block. This lengthens the overall motion compensation process as well as requires extra bandwidth introduced by BIO on top of OBMC. Existing BIO implementations utilizes division operations to calculate the refined motion vectors, and per-pixel based division operations are expensive in hardware design because, typically, multiple copies of divisors are required to achieve sufficient throughput, resulting in high demand for silicon area. With respect to motion estimation, BIO is a process of MV refinement over a small range of motion search. Existing BIO implementations update the MC predictors as an outcome. However, the motion vectors stored in the MV buffer are not updated accordingly after the refinement, causing an asynchronous design between the MC predictors and the associated motion vectors. The calculation of motion vector refinement currently employs 6-tap interpolation filters and gradient filters, which results in increased complexity.

This disclosure describes techniques that may address issues described above with respect to known implementations of BIO. The following techniques may be applied individually, or alternatively, in any combination.

According to one techniques of this disclosure, video encoder 20 and video decoder 30 may implement a block-based BIO scheme designed such that a group of pixels are used to generate a single motion vector refinement for all pixels in the group. The block size can be a pre-defined size including but not limited to 2×2 and 4×4.

Video encoder 20 and video decoder 30 may select the block size adaptively. For example, video encoder 20 and video decoder 30 may select the block size based on the resolution of the frame being coded, the size of the entire CU, the temporal layer of the current picture, QP used for coding the current picture, and/or the coding mode of the current CU.

Video encoder 20 and video decoder 30 may solve equation 4 for a square window Ω, which includes the block itself and a neighborhood of the block being considered. In one example, the size of Ω is 8×8 where the central 4×4 region contains the group of pixels under consideration for calculating the BIO offsets and the surrounding 2-pixel region is the neighborhood of the block.

Video encoder 20 and video decoder 30 may use a weighting function, which may take, including but not limited to, the form of Equation 10, to provide different weights to pixels of different locations within the window. In one example, the pixels lying in the central part of Ω are assigned higher weights than pixels lying around the boundary of Ω. Weighted average can be used to calculate the averaged value of terms in Eq. (7), in order to solve for $v_x$ and $v_y$ for the entire block. In some examples, a median filter may be applied to exclude the outliers in the block before calculating the weighted average to obtain a more stable solution to equation 4. As one example, when a pixel is traversed as in FIG. 7 using a 5×5 window, in the applied weighting function, it may be assumed that all sample locations contribute 1 to the central sample of the window. A median can be applied, such that the samples whose values are number of standard deviations (e.g., 3) away from the median value of the current 5×5 samples are assigned a weight value of 0.

FIGS. 12A-12D show examples of 4×4/2×2 blocks with 1 or 2 pixel extension. In one example, the weighting function can be generated using a running window as follows:

$$w(x, y) = \sum_{\Omega_{(x,y)} \cap B} k, x \in [0, W-1], y \in [0, H-1] \quad (11)$$

where $\Omega_{(x,y)}$ is the neighborhood (which shares the same size of the extension of the block) of pixel location (x, y), B is the set of pixels where gradient values (e.g. the 4×4/2×2 block) will be calculated, and k is a constant (pre-defined or signalled through SPS/PPS/Slice Header).

FIGS. 12A-12D show examples of weighting functions. FIG. 12A shows an example of a weighting functions for a 4×4 block with a 2-pixel extension. FIG. 12B shows an example of a weighting functions for a 4×4 block with a 1-pixel extension. FIG. 12C shows an example of a weighting functions for a 2×2 block with a 2-pixel extension. FIG. 12D shows an example of a weighting functions for a 2×2 block with a 1-pixel extension.

Additionally, if information about whether a pixel belongs to an occluded object between Ref0 and Ref1 is available, neighboring pixels belonging to occluded objects may be assigned lighter weights. In one example, the weights of pixel belonging to occluded objects are assigned to 0 and for other pixels, the weights remain unchanged. This allows pixel-level control on whether a specific pixel location is involved with the BIO derivation. As one example of how to determine if a pixel is occluded, the difference between the current sample and the averaged sample from L0 and L1 prediction can be denoted Db; the difference between the current sample and the collocated sample from L0 be denoted D0; and the collocated sample from L1 be D1, respectively. If Db/D0>>1 or Db/D1>>1, then a pixel may be identified as occluded.

The range of the neighborhood for BIO can be pre-defined. In some examples, the range can be signaled via the SPS, PPS, and Slice Header. In some examples, the range can be made adaptive based on coding information including but not limited to the BIO block size, CU size, or the resolution of the frame.

According to another technique of this disclosure, video encoder 20 and video decoder 30 may update the motion vector of a block after the motion refinement of BIO. In this process, video encoder 20 and video decoder 30 may refine the motion vector (or motion field) of a block by adding the motion information offset derived in BIO. The update can occur after the regular MC process of the current block and refine the MV of the current CU/block before OBMC for subsequent CU/block, so that the updated MV is involved in the OBMC operation of the subsequent CU/blocks. In some examples, the update can occur after OBMC for the subsequent CUs, so that the updated motion vector is only used for prediction of motion vectors.

Video encoder 20 and video decoder 30 may apply the MV update in any of AMVP mode, merge mode, FRUC mode, or other inter prediction modes. In one example, the update for motion vector refinement only occurs for FRUC mode. In one example, the update for motion vector refinement only occurs for merge mode. In one example, the update for motion vector refinement only occurs for AMVP mode. In one example, any combination of two or all of the above items can be used.

In existing implementations of BIO, gradient of fractional sample position is based on the integer samples of the reference pictures and additional interpolation process in horizontal and/or vertical direction. To simplify the process of gradient calculation, the gradient can be calculated based on the prediction samples which have already been interpolated based on the existing MV of the current block/CU. The gradient calculation can be applied to the prediction samples at different stages during the generation of the prediction sample. For example, to generate the prediction samples for a bi-prediction block, it will first generate L0 prediction samples and L1 prediction samples and then the L0 and L1 prediction samples are weighted averaged to generate the bi-prediction samples. When OBMC is enabled, the generated bi-prediction samples are further weighted average with the prediction samples using the neighboring MVs to generate the final prediction samples. In this example, the gradient calculation can be applied to either L0, L1 prediction samples independently; or the gradient calculation can be only applied to the bi-prediction samples and the final prediction samples with the assumption that L0 and L1 predictors share the same gradient values. That is, instead of calculating the gradient values separately using Ref0/Ref1 and summed up during the derivation of BIO motion vectors/offsets, the gradient calculation on the bi-prediction samples can obtain the summed gradient values in a single step.

In one implementation, video encoder 20 and video decoder 30 may apply a 2-tap gradient filter to the prediction samples to calculate the gradients. Let the position of the current pixel in a block be (x, y) and the MC predictor at this location is denoted by P(x, y). The gradient value can be calculated by:

$$G_x(x,y)=((P(\min(x+1,W-1),y)-P(\max(x \times 1,0),y))*K)$$
$$>>S \text{ for } x \in [0,W-1]$$

$$G_y(x,y)=((P(x,\min(H-1,y+1))-P(x,\max(0,y-1)))*K)$$
$$>>S \; y \in [0,H-1] \quad (12)$$

where K and S are scaling factors which can be pre-defined values, W denotes the block width, and H denotes the block height. Note that the location (x, y) can be at any fractional-pel location after interpolation. In one example, the values can be (24, 12, 8) or (26, 13, 8). These values can be signalled through SPS, PPS, or Slice Header.

In one example, video encoder 20 and video decoder 30 may apply a longer-tap gradient filter to the prediction samples to calculate the gradients. For example, the filter with coefficients as {8, −39, −3, 46, −17, 5} can be applied. In some examples, the filter with filter coefficients {1, −5, 0, 5, −1}, or other symmetric filter is used. In some examples, the filter with coefficients {10, −44, 0, 44, −10, 0} is used.

According to another technique of this disclosure, video encoder 20 and video decoder 30 may not implement the BIO process on OBMC or only conditionally implement the BIO process on OBMC. BIO can utilize reference samples to generate the offset, or it can utilize the MC/OBMC predictors to generate the offset. The generated BIO offset is added to either the MC predictors or the OBMC predictors as motion vector refinement.

FIGS. 13-18 show examples of simplified BIO designs in accordance with the techniques of this disclosure. The techniques of FIGS. 13-18 may be used in conjunction with, or as alternatives to, the design shown in FIG. 11. In the examples of FIGS. 13-18, the boxes labeled MC, BIO, and OBMC generally perform the same functions as MC 202, BIO 204, OBMC, 206, and BIO 208 described above.

Figure 13:
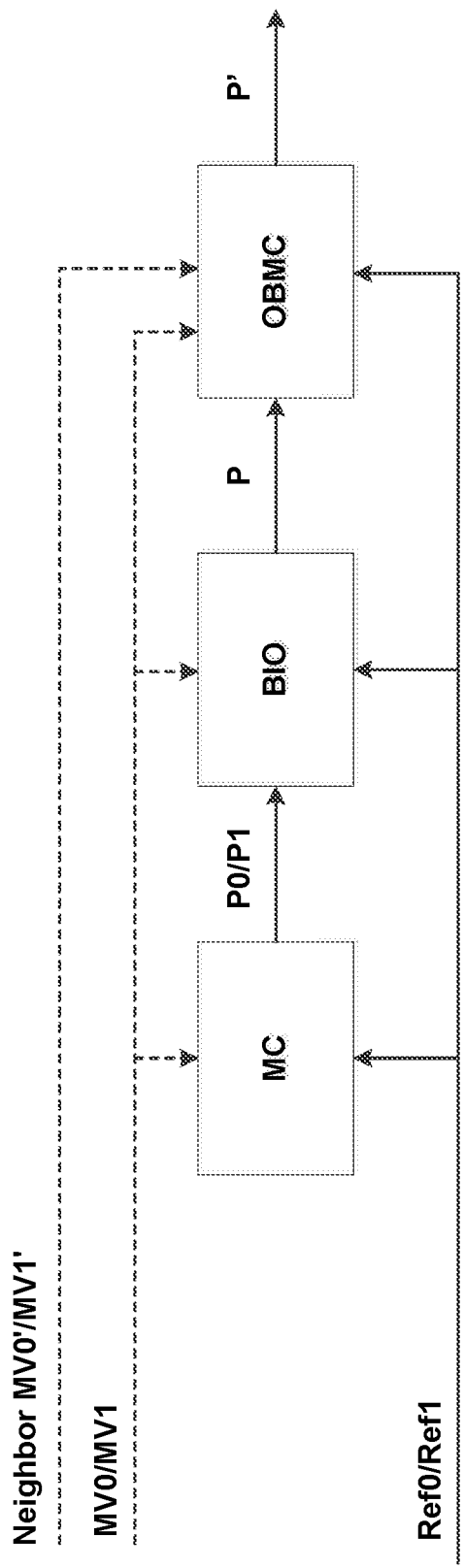
FIG. 13 shows an example of BIO derived according to techniques of this disclosure.

FIG. 13 shows an example of a simplified BIO design in accordance with the techniques of this disclosure. FIG. 13 shows an example of BIO derived from Ref0/Ref1 and applied to MC predictors P0/P1. BIO process on OBMC is removed. BIO offsets are derived from MV0/MV1, Ref0/Ref1, and MC predictor P0/P1, and the offsets are added to P0/P1 during Bi-average. Predictor P' is the final predictor of the overall MC process. The dotted lines indicate the motion vector information in the figure and the solid lines indicate the actual pixel data either for prediction or reference samples. In FIG. 13, the BIO operation following MC utilizes the MC predictors P0/P1 along with the gradient values derived from Ref0/Ref1 using motion vectors MV0/MV1 to calculate the motion vector refinement and offsets. The output of the BIO P is generated by bi-average of P0/P1 added by BIO offsets on a per-pixel basis (even with block-level BIO where the motion vector refinement remains the same within the block, BIO offset can still be on a per-pixel basis since gradient values for each pixel can be different).

Figure 14:
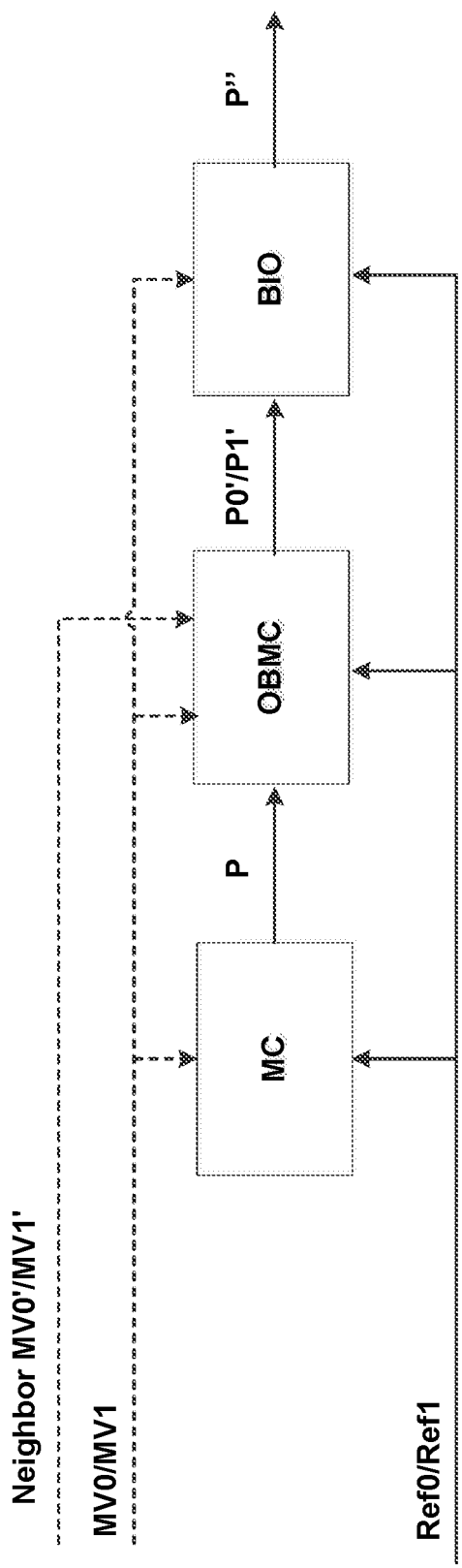
FIG. 14 shows an example of BIO derived according to techniques of this disclosure.

FIG. 14 shows an example of a simplified BIO design in accordance with the techniques of this disclosure. FIG. 14 shows an example of BIO derived from Ref0/Ref1 and applied to OBMC predictors P0'/P1'. BIO offsets are derived from MV0/MV1, Ref0/Ref1, and the OBMC predictors P0'/P1', and the offsets are added to P0'/P1' during Bi-average. Predictor P''' is the final predictor of the overall MC process.

Figure 15:
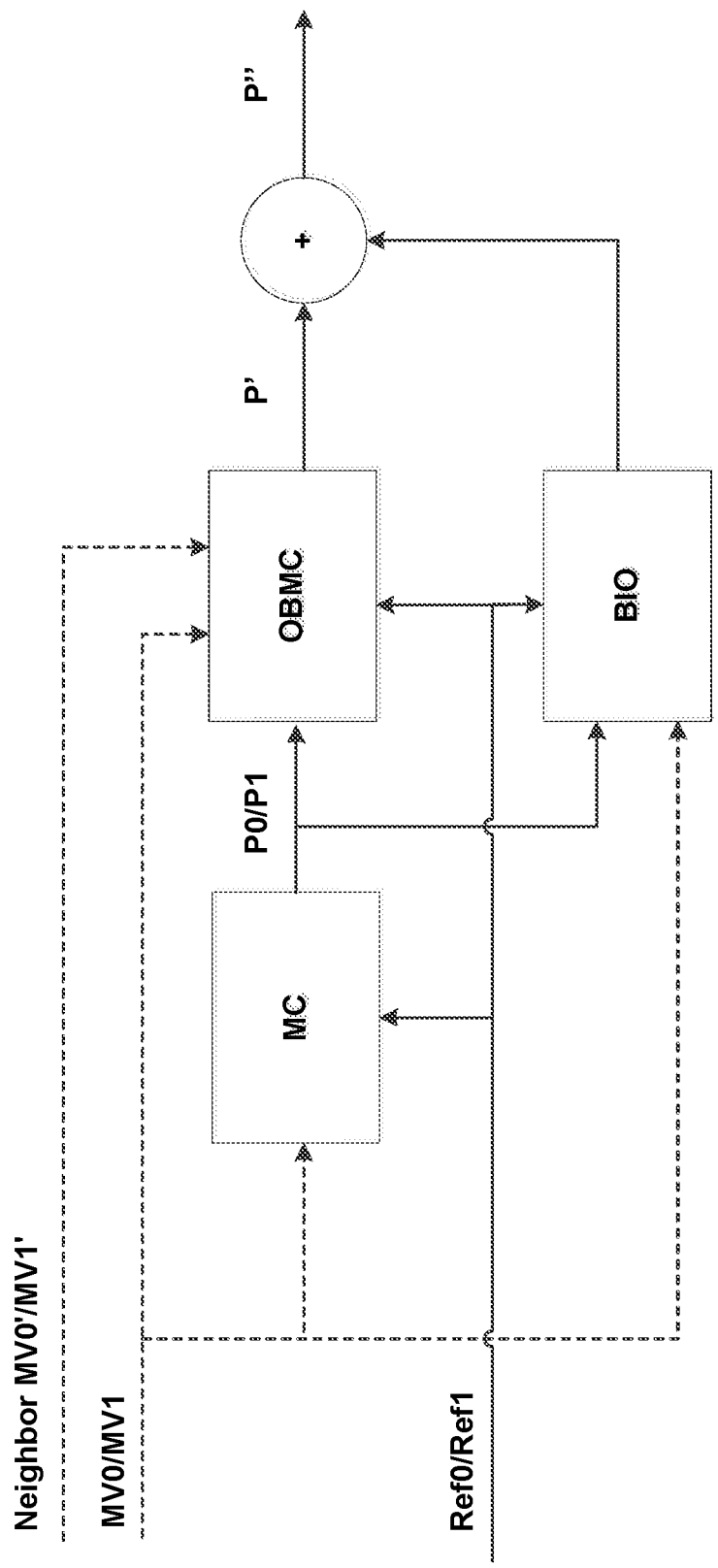
FIG. 15 shows an example of BIO derived according to techniques of this disclosure.

FIG. 15 shows an example of a simplified BIO design in accordance with the techniques of this disclosure. FIG. 15 shows an example of BIO derived from/applied to MC predictors P0/P1. Gradient values are calculated using MV0/MV1 and Ref0/Ref1, and then to generate the BIO offsets along with MC predictor P0/P1. The offsets are added to the OBMC predictor P' to generate the final predictor P''' of the overall MC process.

Figure 16:
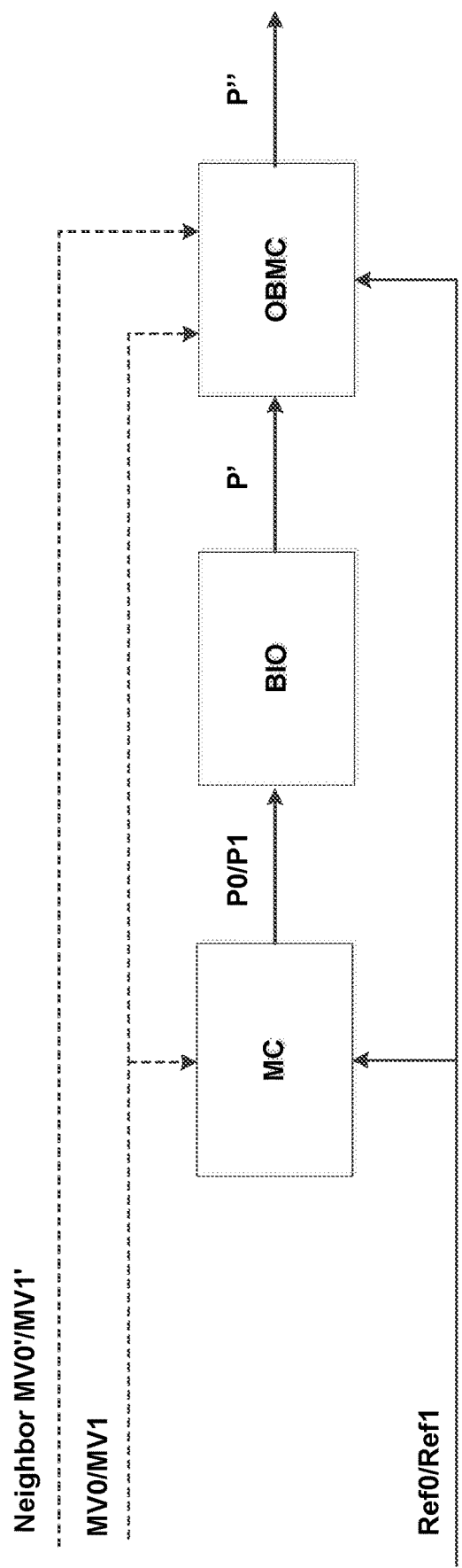
FIG. 16 shows an example of BIO derived according to techniques of this disclosure.

FIG. 16 shows an example of a simplified BIO design in accordance with the techniques of this disclosure. FIG. 16 shows an example of BIO derived from/applied to MC predictors P0/P1. BIO offsets are calculated using the MC predictors P0/P1, and the offsets are added to P0/P1 during Bi-average, followed by an OBMC process to generate the final predictor P''' of the overall MC process.

Figure 17:
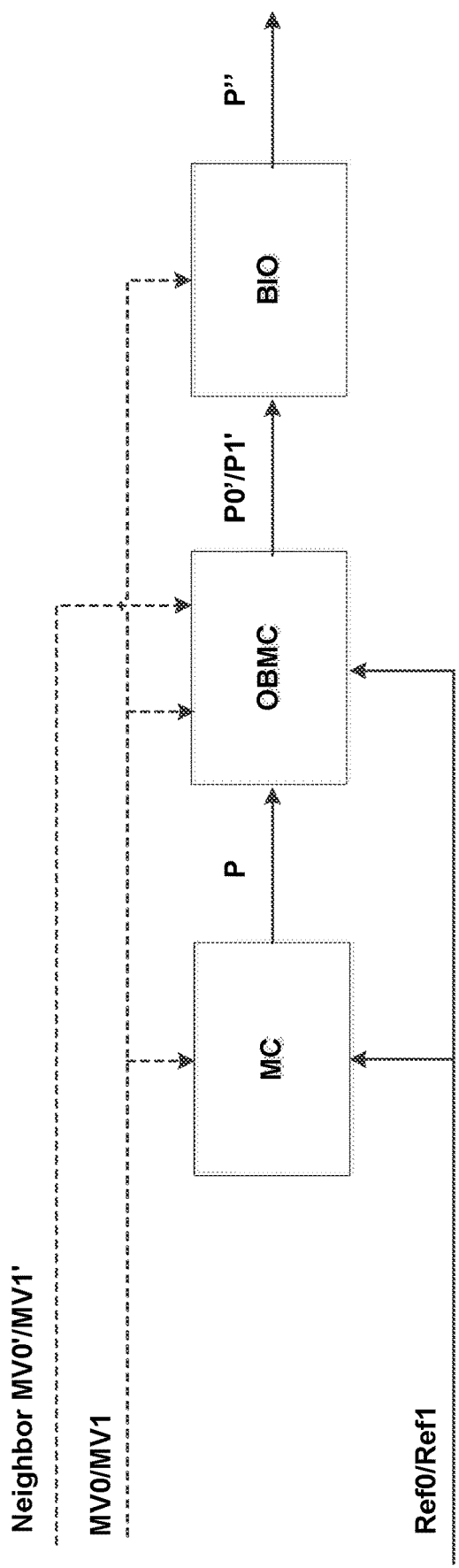
FIG. 17 shows an example of BIO derived according to techniques of this disclosure.

FIG. 17 shows an example of a simplified BIO design in accordance with the techniques of this disclosure. FIG. 17 shows an example of simplified BIO using only OBMC predictor. Gradient values are derived using the OBMC predictors P0'/P1' and motion vectors MV0/MV1, and the BIO offsets are calculated using the OBMC predictors P0'/P1'. The offsets are added to P0'/P1' during Bi-average to generate the final predictor P''' of the overall MC process.

In one example, video encoder 20 and video decoder 30 may conditionally disable the BIO in OBMC. Let $MV_{CUR}x$ and $MV_{NBR}x$ be the motion vectors of current block and the neighboring block for Listx (where x is 0 or 1) during OBMC process. In one example, if the absolute value of the motion vector difference between $MV_{CUR}0$ and $MV_{NBR}0$, and absolute value of the motion vector difference between $MV_{CUR}1$ and $MV_{NBR}1$ are both less than a threshold, the BIO in OBMC can be disabled. The threshold can be signalled via SPS/PPS/Slice Header, or a pre-defined value (e.g., half-pixel, one-pixel, or any value that is equal to the search range of the BIO motion vector refinement) can be used. In another example, if the absolute value of the motion vector difference between $MV_{NBR}0$ and $MV_{NBR}1$ is less than a threshold, BIO in OBMC can be disabled.

In one example, video encoder 20 and video decoder 30 may cap the number of BIO operations in the overall MC process with a pre-determined value. For example, the BIO process is at most performed N times (e.g. N can be 1 or any positive integer) for each block (block can be CTU, CU, PU or an M×N block). In one example, the BIO is only allowed to be performed once for each block. When the prediction samples are generated using current motion information with BIO applied, no further BIO is allowed for the generation of the other prediction samples for current block such as OBMC or any other methods to refine the prediction samples. However, when the prediction samples are generated using current motion information without BIO applied, at most one BIO is allowed for the generations of the other prediction samples for current block such as OBMC or any other method to refine the prediction samples.

According to techniques of this disclosure, video encoder 20 and video decoder 30 may implemented a block-based design for BIO. Instead of pixel level motion refinement in JEM5, the motion refinement is done based on 4×4 block. In the block-based BIO the weighted summation of gradients for the samples in a 4×4 block is used to derive BIO motion vector offsets for the block.

Figure 18:
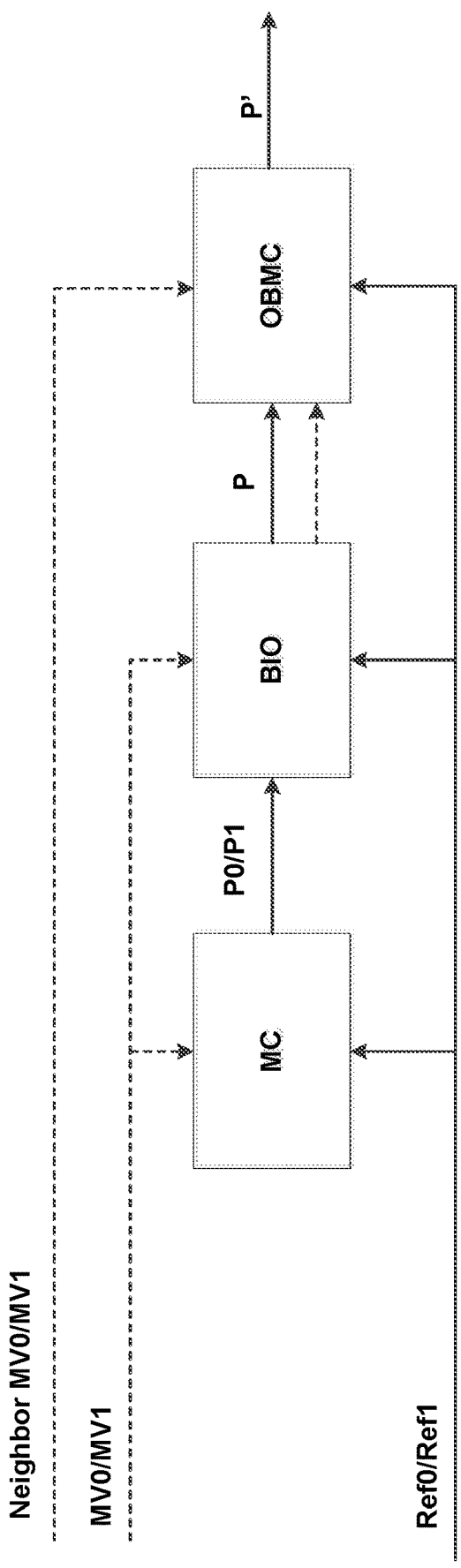
FIG. 18 shows an example of BIO derived according to techniques of this disclosure.

The other process, such as calculation of gradients, BIO motion vectors and offsets, may, for example, follow the same procedure as done in the current JEM. After the 4×4 MV for each MV is obtained with block-based BIO, the MV buffer is updated and used for subsequent CU coding. The overall block diagram is shown in FIG. 18, where the OMBC is applied without BIO operation.

Simulation results on both RA and LDB are shown in the follow tables.

| | Random Access Main 10 Over JEM-5.0.1 | | | | |
|---|---|---|---|---|---|
| | Y | U | V | EncT | DecT |
| Class A1 | −0.1% | −0.4% | −0.3% | 91% | 90% |
| Class A2 | −0.1% | −0.2% | −0.3% | 88% | 84% |
| Class B | −0.1% | −0.2% | −0.1% | 88% | 83% |
| Class C | 0.1% | −0.2% | −0.2% | 92% | 85% |
| Class D | 0.3% | −0.2% | −0.2% | 89% | 84% |
| Class E | | | | | |
| Overall (Ref) | 0.0% | −0.2% | −0.2% | 90% | 85% |

| | Low delay B Main10 Over JEM-5.0.1 | | | | |
|---|---|---|---|---|---|
| | Y | U | V | EncT | DecT |
| Class A1 | | | | | |
| Class A2 | | | | | |
| Class B | 0.0% | 0.4% | 0.1% | 93% | 89% |
| Class C | 0.1% | 0.2% | 0.2% | 96% | 91% |
| Class D | 0.0% | 0.2% | −0.5% | 94% | 90% |
| Class E | −0.1% | 0.6% | 0.0% | 96% | 89% |
| Overall (Ref) | 0.0% | 0.3% | 0.0% | 95% | 90% |

Figure 19:
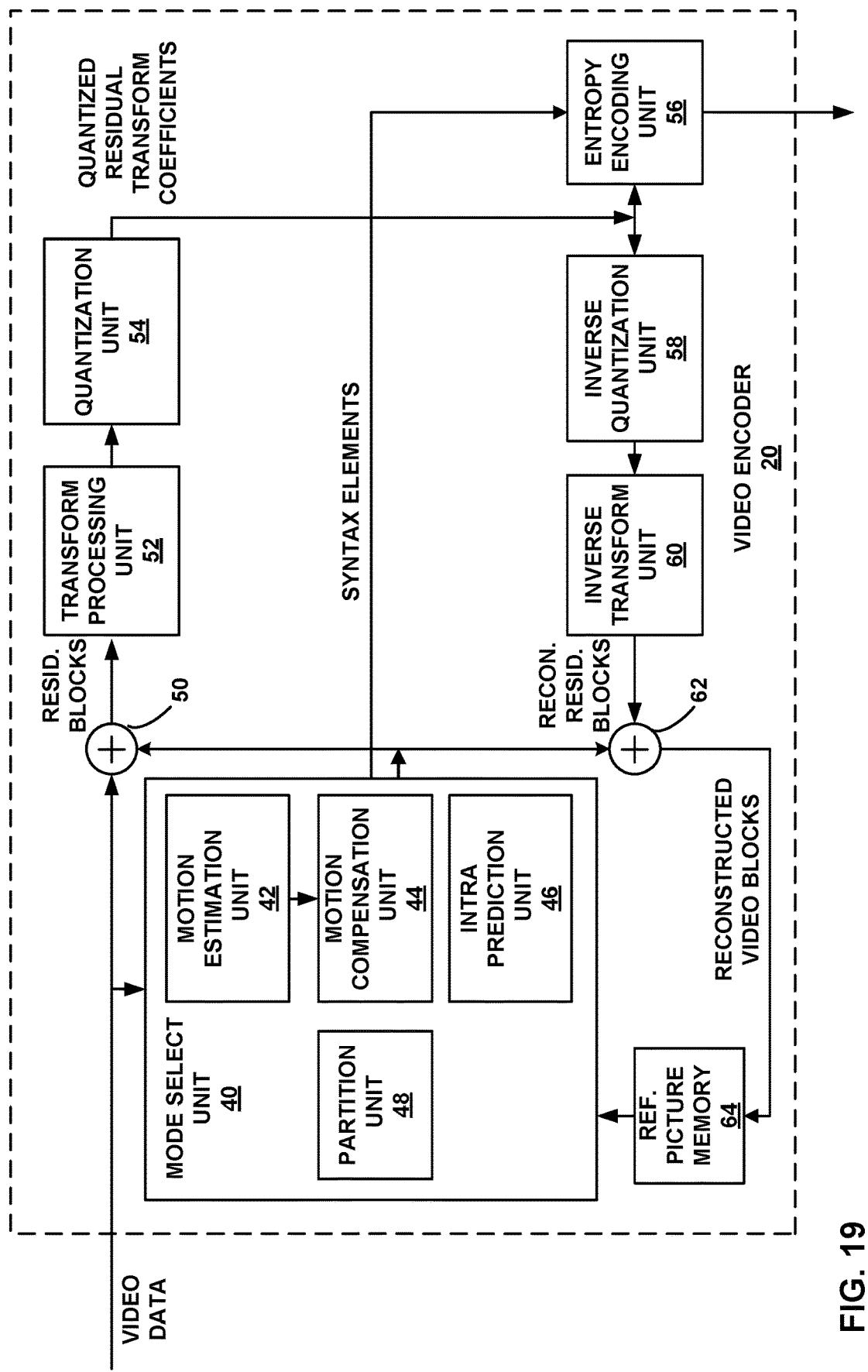
FIG. 19 is a block diagram illustrating an example of a video encoder.

FIG. 19 is a block diagram illustrating an example of video encoder 20 that may implement techniques for bi-directional optical flow. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 19, video encoder 20 receives a current video block within a video frame to be encoded. In the example of FIG. 19, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 19) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 62 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively intra-predict the received video block using pixels of one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Furthermore, motion compensation unit 44 may be configured to perform any or all of the techniques of this disclosure (alone or in any combination). Although discussed with respect to motion compensation unit 44, it should be understood that mode select unit 40, motion estimation unit 42, partition unit 48, and/or entropy encoding unit 56 may also be configured to perform certain techniques of this disclosure, alone or in combination with motion compensation unit 44. In one example, motion compensation unit 44 may be configured to perform the BIO techniques discussed herein.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block including transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 20:
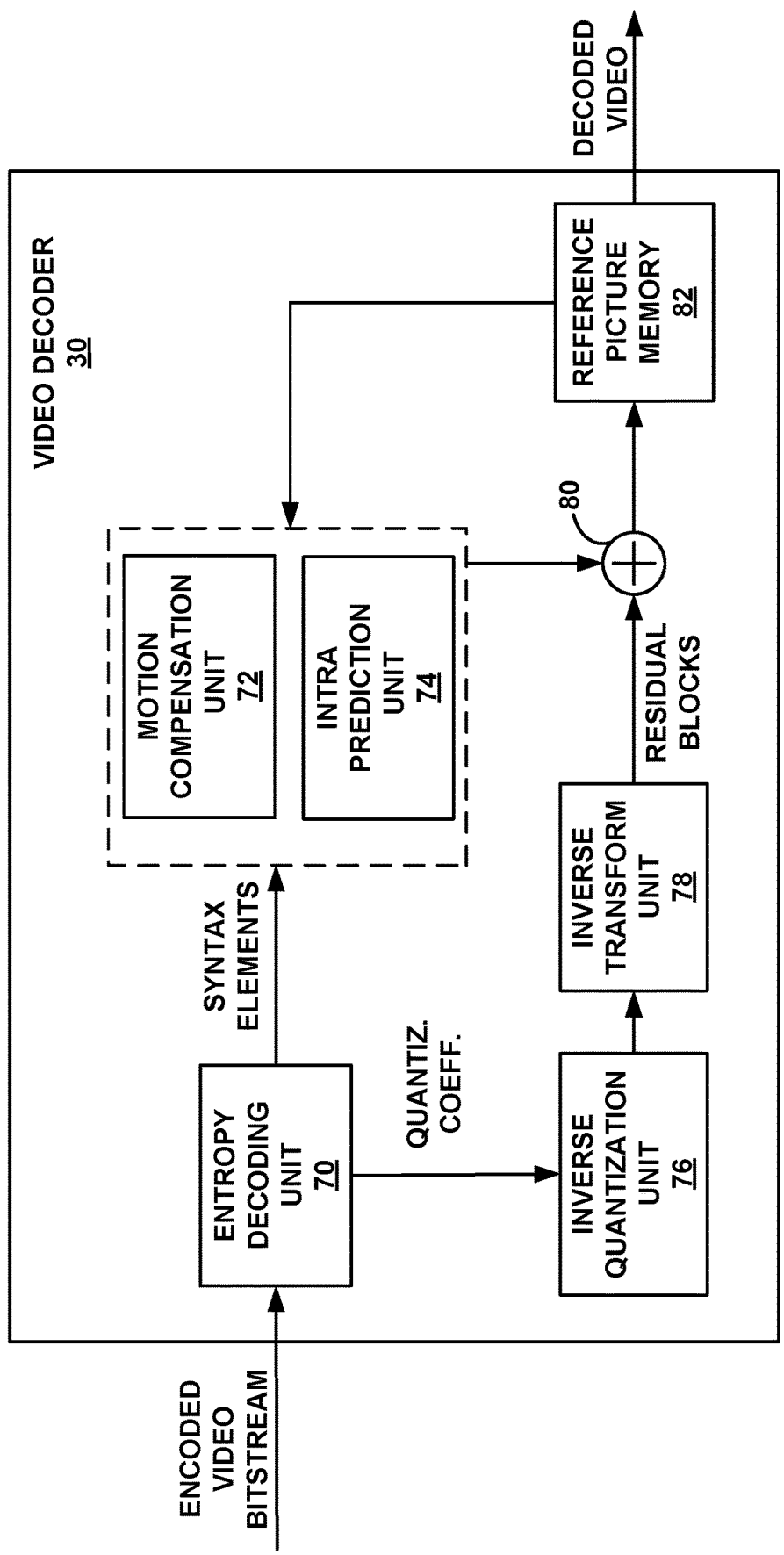
FIG. 20 is a block diagram illustrating an example of a video decoder that may implement techniques for bi-directional optical flow.

FIG. 20 is a block diagram illustrating an example of video decoder 30 that may implement techniques for bi-directional optical flow. In the example of FIG. 20, video decoder 30 includes an entropy decoding unit 70, motion compensation unit 72, intra prediction unit 74, inverse quantization unit 76, inverse transform unit 78, reference picture memory 82 and summer 80. Video decoder 30 may, in some examples, perform a decoding pass generally reciprocal to the encoding pass described with respect to video encoder 20 (FIG. 19). Motion compensation unit 72 may generate prediction data based on motion vectors received from entropy decoding unit 70, while intra prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters for sub-pixel precision. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Furthermore, motion compensation unit 72 may be configured to perform any or all of the techniques of this disclosure (alone or in any combination). For example, motion compensation unit 72 may be configured to perform the BIO techniques discussed herein.

Inverse quantization unit 76 inverse quantizes, i.e., de-quantizes, the quantized transform coefficients provided in the bitstream and decoded by entropy decoding unit 70. The inverse quantization process may include use of a quantization parameter QPy calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transforms, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1. For example, reference picture memory 82 may store decoded pictures.

Figure 21:
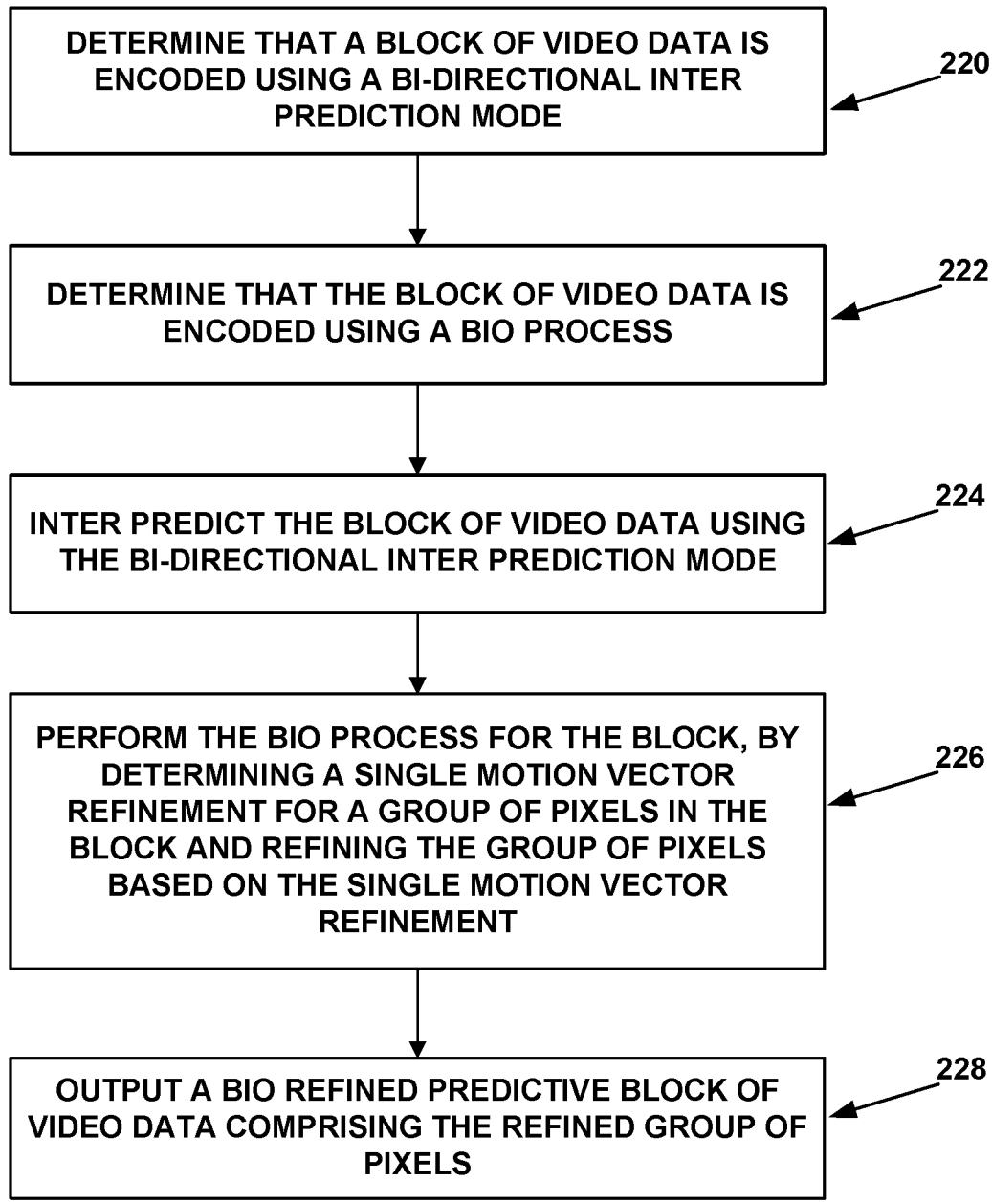
FIG. 21 is a flowchart illustrating an example method of decoding video data in accordance with techniques described in this disclosure.

FIG. 21 is a flow diagram illustrating an example video decoding technique described in this disclosure. The techniques of FIG. 21 will be described with reference to a generic video decoder, such as but not limited to video decoder 30. In some instances, the techniques of FIG. 21 may be performed by a video encoder such as video encoder 20, in which case the generic video decoder corresponds to the decoding loop of the video encoder.

In the example of FIG. 21, the video decoder determines that a block of video data is encoded using a bi-directional inter prediction mode (220). The video decoder determines that the block of video data is encoded using a BIO process (222). The video decoder inter predicts the block of video data according to the bi-directional inter prediction mode (224). To inter predict the block of video data, the video decoder may locate a first reference block in a first picture, locate a second reference block in a second reference picture, and generate a first predictive block based on the first reference block and the second reference block. The group of pixels belongs to the first predictive block.

The video decoder performs the BIO process for the block by determining a single motion vector refinement for a group of pixels in the block and refines the group of pixels based on the single motion vector refinement (226). The group of pixels includes at least two pixels. To perform the BIO process for the block, the video decoder may apply the BIO process to the group of pixels of the first predictive block to generate the BIO refined predictive block. The group of pixels may, for example, be a 4×4 block.

To refine the group of pixels based on the single motion vector refinement, the video decoder may, for example, applying a same refinement to all pixels in the group. To determine the single motion vector refinement for the group of pixels. the video decoder may determine a motion vector field for a window of pixels that includes the group of pixels and pixels in a region surrounding the group of pixels. The window may, for example, be an 8×8 block of pixels, a 6×6 block of pixels, or some other size window. To determine the motion vector field for the window of pixels, the video decoder may, for example, apply a first weighting to a pixel adjacent to a boundary of the window and apply a second weighting to a pixel not adjacent to any boundary of the window, with the second weighting being greater than the first weighting. To determine the motion vector field for the window of pixels, the video decoder may apply a median filter to the window of pixels.

The video decoder outputs a BIO refined predictive block of video data that includes the refined group of pixels (228). The BIO refined predictive block may undergo additional processing, such as an OBMC process and/or one or more loop filters, prior to being output. In instances where the video decoder is part of a video encoder, then the video decoder may output the BIO refined predictive block of video data by storing a decoded picture including the BIO refined predictive block of video data in a decoded picture buffer for use as reference picture in encoding subsequent pictures of video data. In instances where the video decoder is decoding the video data for display, then the video decoder may output the BIO refined predictive block of video data by storing a decoded picture including the BIO refined predictive block of video data in a decoded picture buffer for use as reference picture in decoding subsequent pictures of video data and by outputting the decoded picture including the BIO refined predictive block of video data, possibly after further processing such the application of one or more loop filters, to a display device.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that a block of video data is encoded using a bi-directional inter prediction mode;
    determining that the block of video data is encoded using a bi-directional optical flow (BIO) process;
    inter predicting the block of video data according to the bi-directional inter prediction mode;
    performing the BIO process for the block, wherein performing the BIO process for the block comprises:
        determining a single motion vector refinement for a group of pixels in the block based on pixels within a neighborhood surrounding the group of pixels, wherein the neighborhood comprises a first square block of pixels; and
        refining the group of pixels based on the single motion vector refinement, wherein the group of pixels comprises a second square block of pixels that is smaller than the first square block of pixels; and
    outputting a BIO refined predictive block of video data comprising the refined group of pixels.

2. The method of claim 1, wherein the group of pixels comprises a 4×4 block.

3. The method of claim 1, wherein refining the group of pixels based on the single motion vector refinement comprises applying a same refinement to all pixels in the group.

4. The method of claim 1, wherein:
    inter predicting the block of video data comprises locating a first reference block in a first picture, locating a second reference block in a second reference picture, and generating a first predictive block based on the first reference block and the second reference block, wherein the group of pixels belongs to the first predictive block; and
    performing the BIO process for the block comprises applying the BIO process to the group of pixels of the first predictive block to generate the BIO refined predictive block.

5. The method of claim 1, wherein determining the single motion vector refinement for the group of pixels comprises determining a motion vector field for a window of pixels, wherein the window of pixels comprises the group of pixels and pixels in a region surrounding the group of pixels.

6. The method of claim 5, wherein the window comprises an 8×8 block of pixels.

7. The method of claim 5, wherein the window comprises a 6×6 block of pixels.

8. The method of claim 5, wherein determining the motion vector field for the window of pixels comprises:
    applying a first weighting to a pixel adjacent to a boundary of the window; and
    applying a second weighting to a pixel not adjacent to any boundary of the window, wherein the second weighting is greater than the first weighting.

9. The method of claim 5, wherein determining the motion vector field for the window of pixels comprises:
    applying a median filter to the window of pixels.

10. The method of claim 1, further comprising:
    applying an Overlapped Block Motion Compensation (OBMC) process to the BIO refined predictive block.

11. The method of claim 1, wherein the method for decoding the video data is performed as part of a reconstruction loop of a video encoding process.

12. A device for decoding video data, the device comprising:
    a memory configured to store the video data; and
    one or more processors configured to:
        determine that a block of video data is encoded using a bi-directional inter prediction mode;
        determine that the block of video data is encoded using a bi-directional optical flow (BIO) process;
        inter predict the block of video data according to the bi-directional inter prediction mode;
        perform the BIO process for the block, wherein to perform the BIO process for the block, the one or more processors are configured to:

determine a single motion vector refinement for a group of pixels in the block based on pixels within a neighborhood surrounding the group of pixels, wherein the neighborhood comprises a first square block of pixels, and refine the group of pixels based on the single motion vector refinement, wherein the group of pixels comprises a second square block of pixels that is smaller than the first square block of pixels; and output a BIO refined predictive block of video data comprising the refined group of pixels.

13. The device of claim 12, wherein the group of pixels comprises a 4×4 block.

14. The device of claim 12, wherein to refine the group of pixels based on the single motion vector refinement, the one or more processors are configured to apply a same refinement to all pixels in the group.

15. The device of claim 12, wherein:
to inter predict the block of video data, the one or more processors are configured to locate a first reference block in a first picture, locate a second reference block in a second reference picture, and generate a first predictive block based on the first reference block and the second reference block, wherein the group of pixels belongs to the first predictive block; and
to perform the BIO process for the block, the one or more processors are configured to apply the BIO process to the group of pixels of the first predictive block to generate the BIO refined predictive block.

16. The device of claim 12, wherein to determine the single motion vector refinement for the group of pixels, the one or more processors are configured to determine a motion vector field for a window of pixels, wherein the window of pixels comprises the group of pixels and pixels in a region surrounding the group of pixels.

17. The device of claim 16, wherein the window comprises an 8×8 block of pixels.

18. The device of claim 16, wherein the window comprises a 6×6 block of pixels.

19. The device of claim 16, wherein to determine the motion vector field for the window of pixels, the one or more processors are configured to:
apply a first weighting to a pixel adjacent to a boundary of the window; and apply a second weighting to a pixel not adjacent to any boundary of the window, wherein the second weighting is greater than the first weighting.

20. The device of claim 16, wherein to determine the motion vector field for the window of pixels, the one or more processors are configured to:
apply a median filter to the window of pixels.

21. The device of claim 12, wherein the one or more processors are configured to:
apply an Overlapped Block Motion Compensation (OBMC) process to the BIO refined predictive block.

22. The device of claim 12, wherein the device comprises a wireless communication device, further comprising a receiver configured to receive encoded video data.

23. The device of claim 22, wherein the wireless communication device comprises a telephone handset and wherein the receiver is configured to demodulate, according to a wireless communication standard, a signal comprising the encoded video data.

24. The device of claim 12, wherein the device comprises a wireless communication device, further comprising a transmitter configured to transmit encoded video data.

25. The device of claim 24, wherein the wireless communication device comprises a telephone handset and wherein the transmitter is configured to modulate, according to a wireless communication standard, a signal comprising the encoded video data.

26. An apparatus for decoding video data, the apparatus comprising:
means for determining that a block of video data is encoded using a bi-directional inter prediction mode;
means for determining that the block of video data is encoded using a bi-directional optical flow (BIO) process;
means for inter predicting the block of video data according to the bi-directional inter prediction mode;
means for performing the BIO process for the block, wherein the means for performing the BIO process for the block comprises:
means for determining a single motion vector refinement for a group of pixels in the block based on pixels within a neighborhood surrounding the group of pixels, wherein the neighborhood comprises a first square block of pixels; and
means for refining the group of pixels based on the single motion vector refinement, wherein the group of pixels comprises a second square block of pixels that is smaller than the first square block of pixels; and
means for outputting a BIO refined predictive block of video data comprising the refined group of pixels.

27. The apparatus of claim 26, wherein the means for refining the group of pixels based on the single motion vector refinement comprises means for applying a same refinement to all pixels in the group.

28. The apparatus of claim 26, wherein:
the means for inter predicting the block of video data comprises means for locating a first reference block in a first picture, means for locating a second reference block in a second reference picture, and means for generating a first predictive block based on the first reference block and the second reference block, wherein the group of pixels belongs to the first predictive block; and
the means for performing the BIO process for the block comprises means for applying the BIO process to the group of pixels of the first predictive block to generate the BIO refined predictive block.

29. The apparatus of claim 26, wherein the means for determining the single motion vector refinement for the group of pixels comprises means for determining a motion vector field for a window of pixels, wherein the window of pixels comprises the group of pixels and pixels in a region surrounding the group of pixels.

30. A computer-readable storage medium storing instructions that when executed by one or more processors cause the one or more processors to:
determine that a block of video data is encoded using a bi-directional inter prediction mode;
determine that the block of video data is encoded using a bi-directional optical flow (BIO) process;
inter predict the block of video data according to the bi-directional inter prediction mode;
perform the BIO process for the block, wherein to perform the BIO process for the block, the instructions cause the one or more processors to:
determine a single motion vector refinement for a group of pixels in the block based on pixels within a neighborhood surrounding the group of pixels, wherein the neighborhood comprises a first square block of pixels; and refine the group of pixels based on the single motion vector refinement, wherein the group of pixels comprises a second square block of pixels that is smaller than the first square block of pixels; and output a BIO refined predictive block of video data comprising the refined group of pixels.

31. The computer-readable storage medium of claim 30, wherein to refine the group of pixels based on the single motion vector refinement, the instructions cause the one or more processors to apply a same refinement to all pixels in the group.

32. The computer-readable storage medium of claim 30, wherein:

to inter predict the block of video data, the instructions cause the one or more processors locate a first reference block in a first picture, locate a second reference block in a second reference picture, and generate a first predictive block based on the first reference block and the second reference block, wherein the group of pixels belongs to the first predictive block; and to perform the BIO process for the block, the instructions cause the one or more processors apply the BIO process to the group of pixels of the first predictive block to generate the BIO refined predictive block.

33. The computer-readable storage medium of claim 30, wherein to determine the single motion vector refinement for the group of pixels, the instructions cause the one or more processors to determine a motion vector field for a window of pixels, wherein the window of pixels comprises the group of pixels and pixels in a region surrounding the group of pixels.

* * * * *